United States Patent
Sinharoy et al.

(10) Patent No.: US 11,216,984 B2
(45) Date of Patent: Jan. 4, 2022

(54) PATCH SPLITTING FOR IMPROVING VIDEO-BASED POINT CLOUD COMPRESSION PERFORMANCE

(71) Applicant: Samsung Electronics Co., Ltd., Suwon-si (KR)

(72) Inventors: Indranil Sinharoy, Richardson, TX (US); Esmaeil Faramarzi, Richardson, TX (US); Madhukar Budagavi, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 58 days.

(21) Appl. No.: 16/734,224

(22) Filed: Jan. 3, 2020

(65) Prior Publication Data
US 2020/0219286 A1 Jul. 9, 2020

Related U.S. Application Data

(60) Provisional application No. 62/790,322, filed on Jan. 9, 2019, provisional application No. 62/869,846, filed
(Continued)

(51) Int. Cl.
*G06T 9/00* (2006.01)
*G06T 3/40* (2006.01)
(Continued)

(52) U.S. Cl.
CPC .............. *G06T 9/00* (2013.01); *G06T 3/40* (2013.01); *G06T 7/0002* (2013.01); *G06T 7/11* (2017.01);
(Continued)

(58) Field of Classification Search
CPC ... G06T 3/40; G06T 7/11; G06T 7/174; G06T 7/40; G06T 7/0002; G06T 7/136;
(Continued)

(56) References Cited

U.S. PATENT DOCUMENTS 6,157,389 A * 12/2000 Knowlton ............. G06T 3/0012
345/660
8,451,323 B1 * 5/2013 Poursohi ................ G06T 7/70
348/46
(Continued)

FOREIGN PATENT DOCUMENTS

CN 103636210 A * 3/2014 ............. H04N 19/14
WO 2018/094141 A1 5/2018
WO 2018/234206 A1 12/2018

OTHER PUBLICATIONS

Graziosi, "[PCC] TMC2 Optimal Texture Packing", ISO/IEC JTC1/SC29/WG11 MPEG2018/m43681, Jul. 2018, 5 pages.
(Continued)

*Primary Examiner* — Kim Y Vu
*Assistant Examiner* — Francisco A Agra

(57) ABSTRACT

An encoding device and methods for point cloud encoding are disclosed. The method for encoding includes generating, using a processor of an encoder, a first frame and a second frame that include patches representing a cluster of points of three-dimensional (3D) point cloud; identifying a patch to segment in the patches of the first frame and the second frame; determining, in response to identifying the patch, a path representing a boundary between segmented regions within the patch; segmenting the patch along the path into two patches for the first frame and the second frame; encoding the first frame and the second frame to generate a compressed bitstream; and transmitting, using a communication interface operably coupled to the processor, the compressed bitstream.

20 Claims, 15 Drawing Sheets

Related U.S. Application Data on Jul. 2, 2019, provisional application No. 62/937,998, filed on Nov. 20, 2019.

(51) Int. Cl.
  *G06T 7/11* (2017.01)
  *G06T 7/174* (2017.01)
  *G06T 7/40* (2017.01)
  *G06T 7/00* (2017.01)
  *G06T 7/136* (2017.01)

(52) U.S. Cl.
  CPC .............. *G06T 7/136* (2017.01); *G06T 7/174* (2017.01); *G06T 7/40* (2013.01); *G06T 2207/10028* (2013.01)

(58) Field of Classification Search
  CPC . G06T 2207/10028; G06T 9/00; G06T 9/001; H04N 19/14; H04N 19/167
  See application file for complete search history.

(56) References Cited

U.S. PATENT DOCUMENTS

| | | | |
|---|---|---|---|
| 8,731,313 B2 | 5/2014 | Thiyanalalnam et al. | |
| 8,811,758 B2 | 8/2014 | Paffenroth et al. | |
| 9,753,124 B2 | 9/2017 | Hayes | |
| 2006/0017730 A1 | 1/2006 | Meinds | |
| 2013/0329808 A1 | 12/2013 | Mohnen et al. | |
| 2015/0139535 A1 | 5/2015 | Siddiqui | |
| 2015/0317821 A1* | 11/2015 | Ding | G06T 15/10 345/420 |
| 2016/0086353 A1 | 3/2016 | Lukac et al. | |
| 2016/0134874 A1 | 5/2016 | Konieczny et al. | |
| 2017/0103510 A1 | 4/2017 | Wang et al. | |
| 2017/0124717 A1* | 5/2017 | Baruch | G06T 7/194 |
| 2017/0193699 A1 | 7/2017 | Mehr et al. | |
| 2017/0221263 A1* | 8/2017 | Wei | G06T 11/001 |
| 2017/0337693 A1* | 11/2017 | Baruch | G06T 7/194 |
| 2017/0347100 A1 | 11/2017 | Chou et al. | |
| 2018/0268570 A1 | 9/2018 | Budagavi et al. | |
| 2019/0087978 A1* | 3/2019 | Tourapis | G06T 9/00 |

OTHER PUBLICATIONS

Faramarzi et al., "[V-PCC] [New Proposal] Improved Texture Padding", ISO/IEC JTC1/SC29/WG11 MPEG2018/46202, Jan. 2019, 4 pages.

"Spherical Video V2 RFC (draft)", dated May 3, 2017, 11 pages. https://github.com/google/spatial-media/blob/master/docs/spherical-video-v2-rfc.md.

Budagavi et al., "OMAF: Extensible Polygon-based Projection Format (EPPF) for VR/360 Video", ISO/IEC JTC1/SC29/WG11 MPEG2017/m39947, Jan. 2017, 4 pages.

Cohen et al., "Point Cloud Attribute Compression using 3-D Intra Prediction and Shape-Adaptive Transforms", Mitsubishi Electric Research Laboratories, Mar. 2016, 12 pages.

Houshiar et al., "3D Point Cloud Compression using Conventional Image Compression for Efficient Data Transmission", 2015 XXV International Conference on Information, Communication and Automation Technologies (ICAT), Oct. 2015, 8 pages.

Max Limper et al., "Box Cutter: Atlas Refinement for Efficient Packing via Void Elimination", ACM Trans. Graph., vol. 37, No. 4, Article 153, Aug. 2018, 13 pages.

Keming Cao et al., "Patch-Aware Averaging Filter for Scaling in Point Cloud Compression", 2018 6th IEEE Global Conference on Signal and Information Processing, Nov. 26-29, 2018, 5 pages.

International Search Report dated Apr. 17, 2020 in connection with International Patent Application No. PCT/KR2020/000314, 3 pages.

Written Opinion of the International Searching Authority dated Apr. 17, 2020 in connection with International Patent Application No. PCT/KR2020/000314, 5 pages.

* cited by examiner

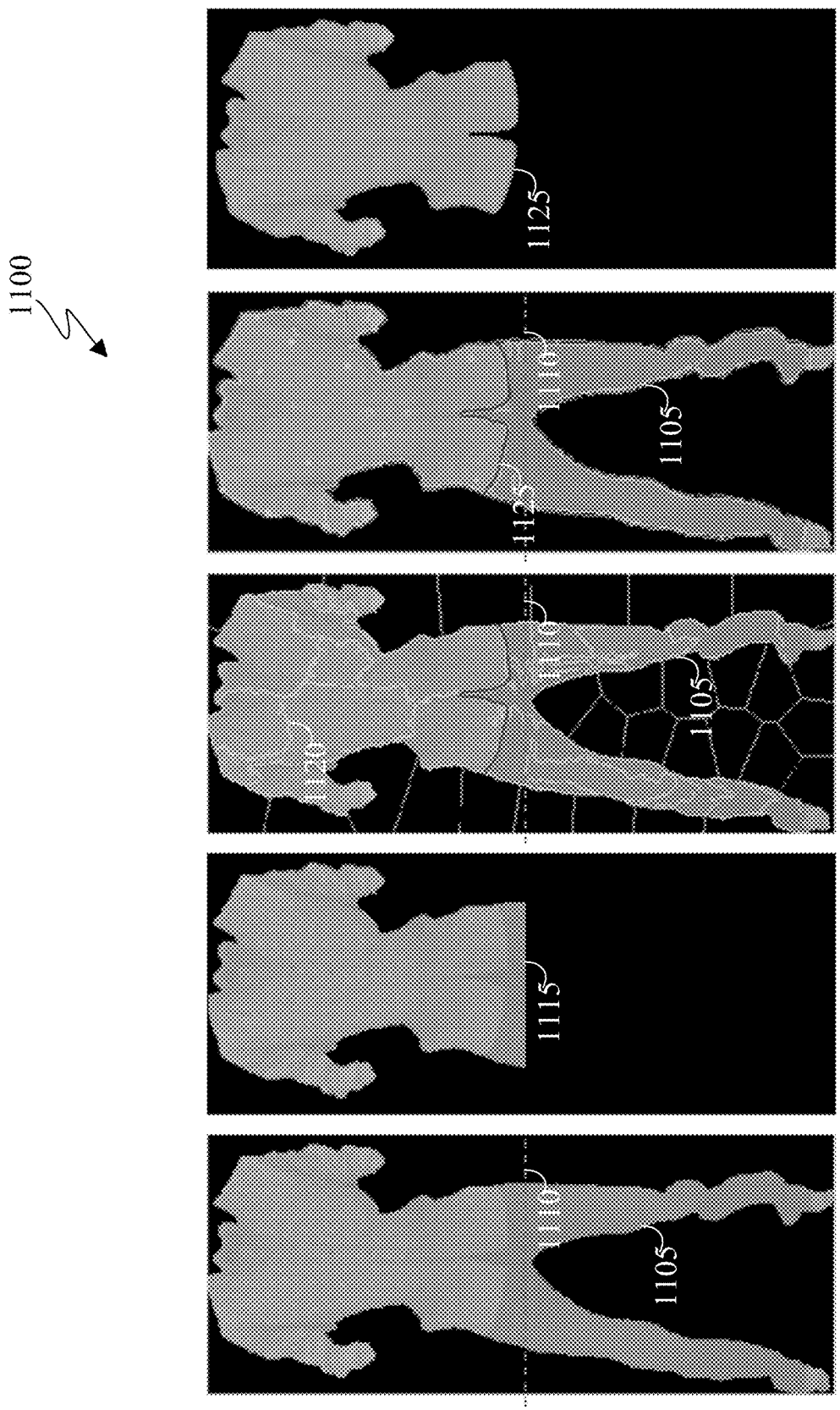

PATCH SPLITTING FOR IMPROVING VIDEO-BASED POINT CLOUD COMPRESSION PERFORMANCE

CROSS-REFERENCE TO RELATED APPLICATION AND CLAIM OF PRIORITY

This application claims priority under 35 U.S.C. § 119(e) to U.S. Provisional Patent Application No. 62/790,322 filed on Jan. 9, 2019; U.S. Provisional Patent Application No. 62/869,846 filed on Jul. 2, 2019; and U.S. Provisional Patent Application No. 62/937,998 filed on Nov. 20, 2019. The above-identified provisional patent applications are hereby incorporated by reference in its entirety.

TECHNICAL FIELD

This disclosure relates generally to compression and coding of volumetric multimedia data. More specifically, this disclosure relates to an apparatus and a method for patch splitting for improving video-based point cloud compression performance.

BACKGROUND

Three hundred sixty-degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors can track head movement of the user in real-time to determine the region of the 360° video that the user wants to view. Multimedia data that is three-dimensional (3D) in nature, such as point clouds are can be used in the immersive environment.

Point clouds are a set of 3D points that represent an objects surface. Point clouds are common in a variety of applications such as gaming, 3D maps, visualizations, medical applications, augmented reality, virtual reality, autonomous driving, multi-view replay, 6DoF immersive media, to name a few.

Video/Image-based point cloud compression systems, such as the MPEG-I Video-based Point Cloud Compression (VPCC) reference model, project points from 3D space to 2D spaces creating patches (for both geometry and texture), which are stored in video frames and encoded using codecs for regular video/image compression. The video/image frame size is determined by the size of the patches and how tightly they can be packed in the video frame. Large size patches lead to inefficient packing and increased frame size. The increase in frame size, in turn, increases the codec complexity. Additionally, the increased frame size also increases the encoded bitstream size. Both of these effects are undesirable from compression systems' standpoint. Moreover, the increase in complexity and bitstream size is even more objectionable for video-based point cloud compression systems, since the added complexity and bitstream size does not add to any significant increase in quality of the reconstructed point cloud.

SUMMARY

This disclosure provides patch splitting for improving video-based point cloud compression performance.

In one embodiment, an encoding device for point cloud encoding is provided. The encoding device includes a processor configured to generate, using a processor of an encoder, a first frame and a second frame that include patches representing a cluster of points of three-dimensional (3D) point cloud; identify a patch to segment in the patches of the first frame and the second frame; determine, in response to identify the patch, a path representing a boundary between segmented regions within the patch; segmenting the patch along the path into two patches for the first frame and the second frame; and encode the two patches in the first frame and the second frame to generate a compressed bitstream. The encoding device further includes a communication interface operably coupled to the processor. The communication interface is configured to transmit the compressed bitstream.

In another embodiment, a method for point cloud decoding is provided. The method includes generating, using a processor of an encoder, a first frame and a second frame that include patches representing a cluster of points of three-dimensional (3D) point cloud; identifying a patch to segment in the patches of the first frame and the second frame; determining, in response to identifying the patch, a path representing a boundary between segmented regions within the patch; segmenting the patch along the path into two patches for the first frame and the second frame; encoding the two patches in the first frame and the second frame to generate a compressed bitstream; and transmitting, using a communication interface operably coupled to the processor, the compressed bitstream.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 11A, 11B, 11C, 11D, and 11E illustrate example patching splitting between a straight line and a dominant boundary in accordance with embodiments of this disclosure;

DETAILED DESCRIPTION

Figure 1:
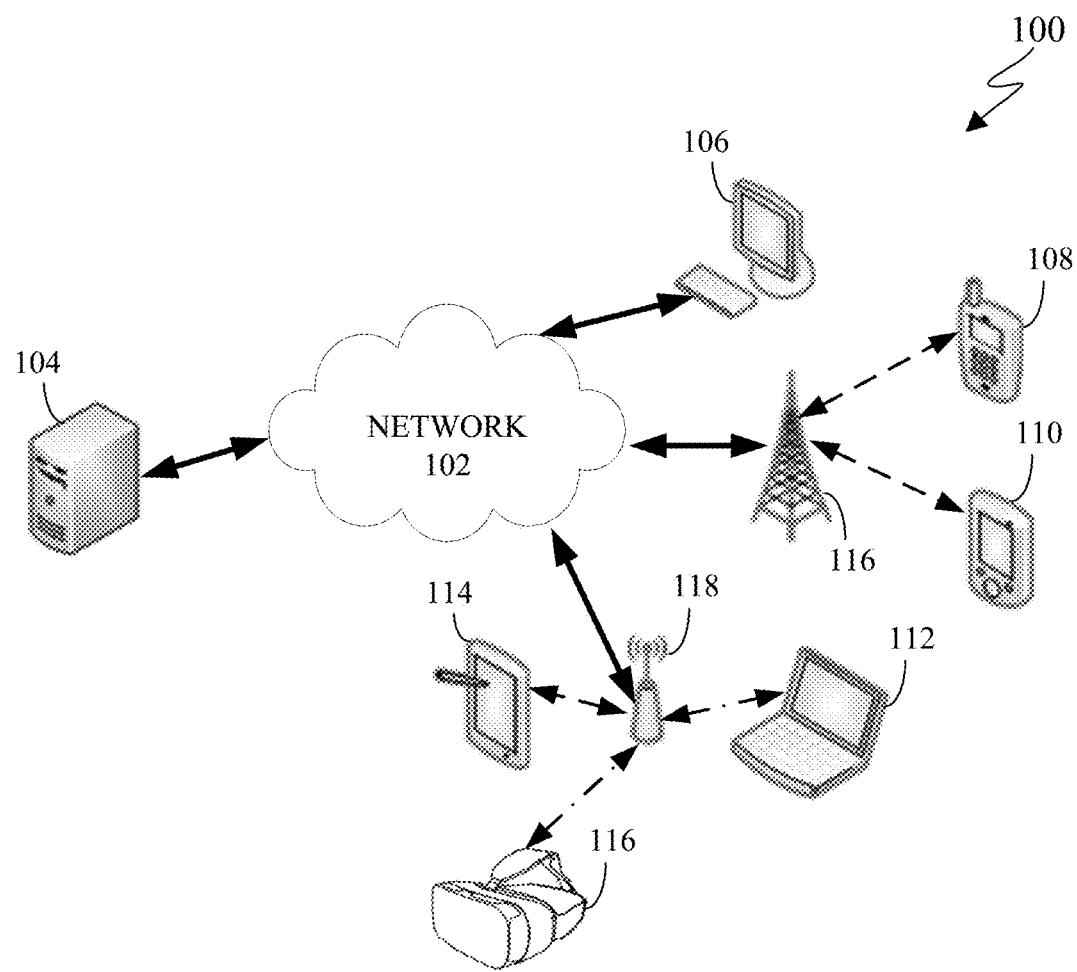
FIG. 1 illustrates an example communication system in accordance with an embodiment of this disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Augmented reality (AR) is an interactive experience of a real-world environment where objects that reside in the real-world environment are augmented with virtual objects, virtual information, or both. Virtual reality (VR) is a rendered version of a visual scene, where the entire scene is computer generated. In certain embodiments, AR and VR include both visual and audio experiences. A visual rendering is designed to mimic the visual stimuli, and if available audio sensory stimuli, of the real world as naturally as possible to an observer or user as the user moves within the limits defined by the application or the AR or VR scene. For example, VR places a user into immersive worlds that respond to the head movements of a user. At the video level, VR is achieved by providing a video experience that covers as much of the field of view (FOV) as possible together with the synchronization of the viewing angle of the rendered video with the head movements.

Many different types of devices are able to provide the immersive experience associated with AR or VR. One example device is a head-mounted display (HMD). An HMD is a device that enables a user to view the VR scene and adjust the displayed content based on movements of the head of the user. An HMD represent one of many types of devices that provide AR and VR experiences to a user. Typically, an HMD relies either on a dedicated screen that is integrated into a device and connected with an external computer (tethered) or on a device, such as a smartphone, that is inserted into the HMD (untethered). The first approach utilizes one or more lightweight screens and benefits from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A point cloud is a virtual representation of an object in three dimensions. For example, a point cloud is a collection of points in 3D space, and each point that is positioned in a particular position within 3D space and includes one or more attributes or textures. A point cloud can be similar to a virtual object in a VR or AR environment. A point mesh is another type of a virtual representation of an object in a VR or AR environment. A point cloud or a point mesh can be an object, multiple objects, a virtual scene (which includes multiple objects), and the like. Point clouds are commonly used in a variety of applications, including gaming, 3D mapping, visualization, medicine, AR, VR, autonomous driving, multi-view replay, 6 degrees of freedom immersive media, to name a few.

Point clouds represent volumetric visual data. In certain embodiments, the points are positioned on the external surface of the object. In certain embodiments, the points are positioned throughout the internal structure and external surfaces of the object. Point clouds consist of numerous points positioned in 3D space. Each point in a 3D point cloud includes an attribute such as a geometric position, represented by 3-tuple (X,Y,Z) coordinate values and can include one or more textures. The location of each point within in a 3D environment or space is identified by the three coordinates (X,Y,Z). Additionally, each point in the point cloud can also include additional textures such as color, reflectance, intensity, surface normal, and the like. A texture can refer to an attribute other than the geometry attribute. A single point of a 3D point cloud can have multiple attributes. For example, a first attribute can represent the geometric position of a point (such as a location of the point in 3D space), while a second attribute or texture can represent the color of the point, a third attribute or texture can represent the reflectiveness of the point, and yet the point can further include additional attributes or textures such as intensity, surface normal, and the like. In some embodiments, an attribute refers only to a texture of a point, and not a geometric position of the points. In some applications, point clouds can also be used to approximate light field data in which, each point includes multiple view-dependent, color information (R, G, B triplets).

A single point cloud can include billions of points, with each point associated with a geometric position and one or more attributes. A geometric position and each additional attribute that is associated with a point occupy a certain number of bits. For example, a geometric position of a single point in a point cloud can consume thirty bits. For instance, if each geometric position of a single point is defined with an X value, a Y value, and a Z value, then each coordinate (the X, the Y, and the Z) uses ten bits, totaling the thirty bits. Similarly, a texture corresponding to the color of a point cloud can consume twenty-four bits. For instance, if a color component of a single point is defined based on a Red value, Green value, and Blue value, then each color component (Red, Green, and Blue) uses eight bits, totaling the twenty-four bits. As a result, a single point with a ten-bit geometric attribute data, per coordinate, and an eight-bit color attribute data, per color value, occupies fifty-four bits. Each additional attribute increases the bits required for a single point. If a frame includes one million points, the number of bits per frame is fifty-four million bits (fifty-four bits per point times one million points per frame). If the frame rate is thirty frames per second and undergoes no compression, then 1.62 gigabytes per second (fifty-four million bits per frame times thirty frames per second) are to be transmitted from one electronic device to another in order for the second device to display the point cloud. Therefore, transmitting an uncompressed point cloud from one electronic device to another uses significant bandwidth due to the size and complexity of the data associated with a single point cloud. As a result, the point cloud is compressed prior to the transmission.

Embodiments of the present disclosure take into consideration that compressing a point clouds is necessary to expedite and improve transmission of the point cloud from one device (such as a source device) to another device (such as a display device) due to the bandwidth necessary to transmit the point cloud. Certain dedicated hardware components can be used to meet the real-time demands or reduce delays or lags in the transmitting and rendering a 3D point cloud; however, such hardware components are often expensive. Additionally, many video codecs are not able to encode and decode 3D video content, such as a point cloud. Compressing and decompressing a point cloud by leveraging existing 2D video codecs enables the encoding and decoding of a point cloud to be widely available without the need for new or specialized hardware. According to embodiments of the present disclosure, leveraging existing video codecs can be used to compress and reconstruct a point cloud, when the point cloud is converted from a 3D state to a 2D state. In certain embodiments, the conversion of a point cloud includes projecting the clusters of points of the 3D point cloud onto 2D frames by creating patches that represent the point cloud. Thereafter, video codecs such as HEVC, AVC, VP9, VP8, JVNET, and the like can be used to compress the 2D frames representing the 3D point cloud similar to a 2D video.

Figure 4A:
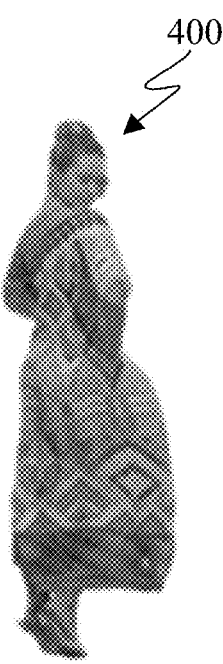
FIGS. 4A, 4B, and 4C illustrate an example 3D point cloud and 2D frames, that represent the 3D point cloud in accordance with an embodiment of this disclosure.
Figure 4B:
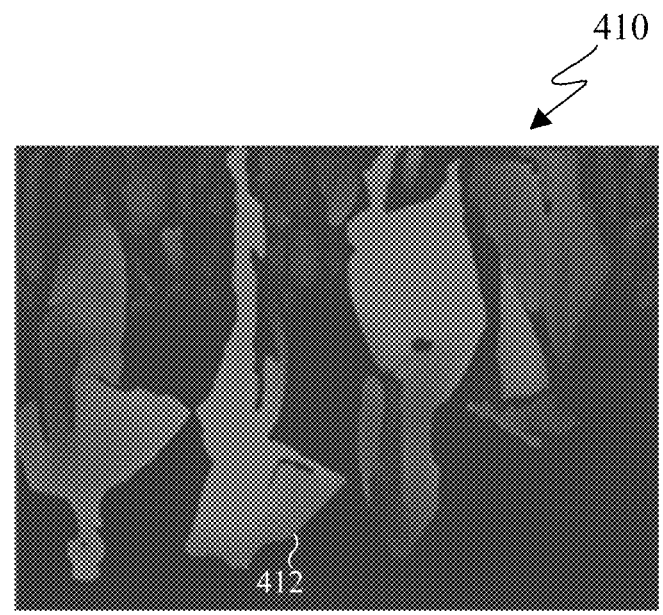
Figure 4C:
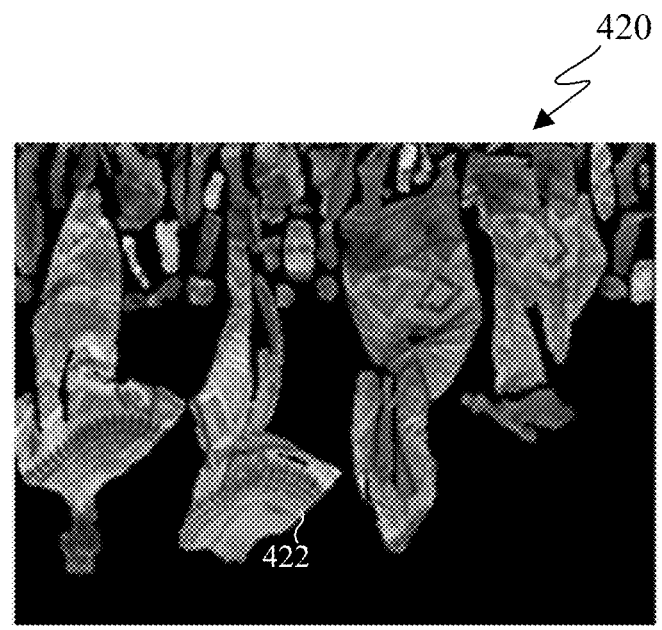

Converting the point cloud includes projecting the point cloud to generate multiple patches and packing the patches onto one or more 2D frames, such that the frames can be compressed, and then transmitted to a display device. Different frames can represent different attributes or textures of the point cloud, such as one frame includes values representing geometry positions of the points and another frame includes values representing color information associated with each of the points. A decoder reconstructs the patches within the 2D frames into the 3D point cloud, such that the point cloud can be rendered, displayed, and then viewed by a user. When the point cloud is deconstructed to fit on multiple 2D frames and compressed, the frames can be transmitted using less bandwidth than used to transmit the original point cloud. FIGS. 4A-4C, which are described in greater detail below, illustrate a 3D point cloud that is projected onto 2D frames by creating patches of the point cloud and two attributes.

Embodiments of the present disclosure provide systems and methods for converting a point cloud into a 2D state that can be transmitted and then reconstructed into the point cloud. In certain embodiments, a point cloud is deconstructed into multiple patches, and multiple frames are generated that include the patches. In certain embodiments, a frame includes patches of the same attributes. When a point cloud is deconstructed into multiple patches, auxiliary information 635, 640 is generated. The auxiliary information 635, 640 can indicate where each patch is located within a frame. The location of the patch within a frame referred to as an offset, as the location of a patch within a frame is offset from its original projection in order to pack more patches into a single frame. The auxiliary information 635, 640 can also indicate the size of the patch. The auxiliary information 635, 640 can further indicate where the patch belongs in 3D space.

During projection the encoder decomposes the point cloud into a set of patches by clustering the points. The geometry and texture information of these patches are packed into various frames. In certain embodiments, the geometry information is packed into a geometry frame and the texture information is packed into a texture frame. When attributes of a point are packed into separate frames, a mapping is generated between the pixels of one frame to the pixels of another frame. For example, the points of the 3D point cloud that are represented in one patch in one frame correspond to the same points that are represented in another patch in a second frame. In certain embodiments, the patches on one frame represent multiple attributes associated with the points of the point cloud, such as a geometric position of the points in 3D space and color.

Each pixel within a patch in the geometry video frame corresponds to a point in 3D space. The two transverse coordinates (with respect to the projection plane) of a 3D point corresponds to the column and row indices in the geometry video frame (u, v) plus a transverse-offset which determines the location of the entire patch within the video frame. The depth of the 3D point is encoded as the value of the pixel in the video frame. The transverse-offset can be included in auxiliary information that is included in the bitstream. The depth of the 3D point cloud depends on whether the projection of the 3D point cloud is taken from the XY, YZ, or XZ coordinates.

Projecting a point in 3D space, from a point cloud, onto 2D frames certain points of the 3D point cloud can be missed, and not included in any of the 2D frames. Thereafter, when the point cloud is reconstructed, by the decoder, cracks and holes can be introduced in the reconstructed could cloud, as certain points were not transmitted from the original 3D point cloud. A point is missed when it is not projected from 3D point cloud to a patch on a 2D video frame. Missed points generally occur near regions of high curvature in the point cloud surface or due to self-occlusions. Additionally, some isolated 3D points are not included in the regular patches as these points they fail to comply with the constraints imposed during the projection onto the 2D frames. For example, the constraints can include a maximum depth constraint, distance from other points in the neighborhood, and the like.

If two or more points are projected to the same pixel location, then one of those points can be missed. Since there could be multiple points being projected to the same pixel of a 2D frame, two layers are considered for patch projection. Near layer stores the points which are closest to the projection plane, while far layer stores the points farthest away from the projection plane which lie within a predefined encoder parameter, known as the surface thickness, from the near layer. Noting this, two layers each of geometry and texture are formed.

An encoder projects the 3D point cloud onto the multiple 2D frames and generates a bitstream. The encoder or another device then transmits the bitstream to different device. The frames can be compressed by leveraging various video compression codecs, image compression codecs, or both. A decoder receives the bitstream, decompresses the bitstream into the frames, and reconstructs the point cloud based on the information within the frames. After the point cloud is reconstructed, the 3D point cloud can be rendered and displayed for a user to observe. In certain embodiments, frames representing different attributes (including the geometric positions of the points) are encoded and decoded separately. In other embodiments, frames representing different attributes (including the geometric positions of the points) are encoded and decoded together.

Embodiments of the present disclosure provide systems and methods for improving the compression, transmission, and reconstruction of a 3D point cloud. Improving the compression of a 3D point cloud reduces the bandwidth required for the transmission as well as reduces the processing power required to reconstruct the 3D point cloud. For example, the transmission of a bitstream can be improved by reducing the information that is transmitted from the encoder to a decoder. For example, to improve the compression, transmission, and reconstruction of a 3D point cloud embodiments of the present disclosure recognize take into consideration that by reducing the quantity of auxiliary information that is generated for each patch increases the coding efficiency.

The present application seeks to improve the compactness (or tightness) of patch packing in the video frames and, as a result, reduce the video frame dimension by splitting the large patches into one or more smaller patches that can fit together more compactly with the other smaller patches. Furthermore, the decision of whether to split a patch, where to split the patch and the patch splitting operation itself is carried out immediately following the initial creation of the patches during point cloud segmentation and 3D to 2D projection.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104

In certain embodiments, any of the client devices 106-116 or the server 104 can create a 3D point cloud, compress a 3D point cloud, transmit a 3D point cloud, receive a 3D point cloud, render a 3D point cloud, or a combination thereof. For example, the server 104 can then compress 3D point cloud to generate a bitstream and then transmit the bitstream to one or more of the client devices 106-116. For another example, one of the client devices 106-116 can compress a 3D point cloud to generate a bitstream and then transmit the bitstream to another one of the client devices 106-116 or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
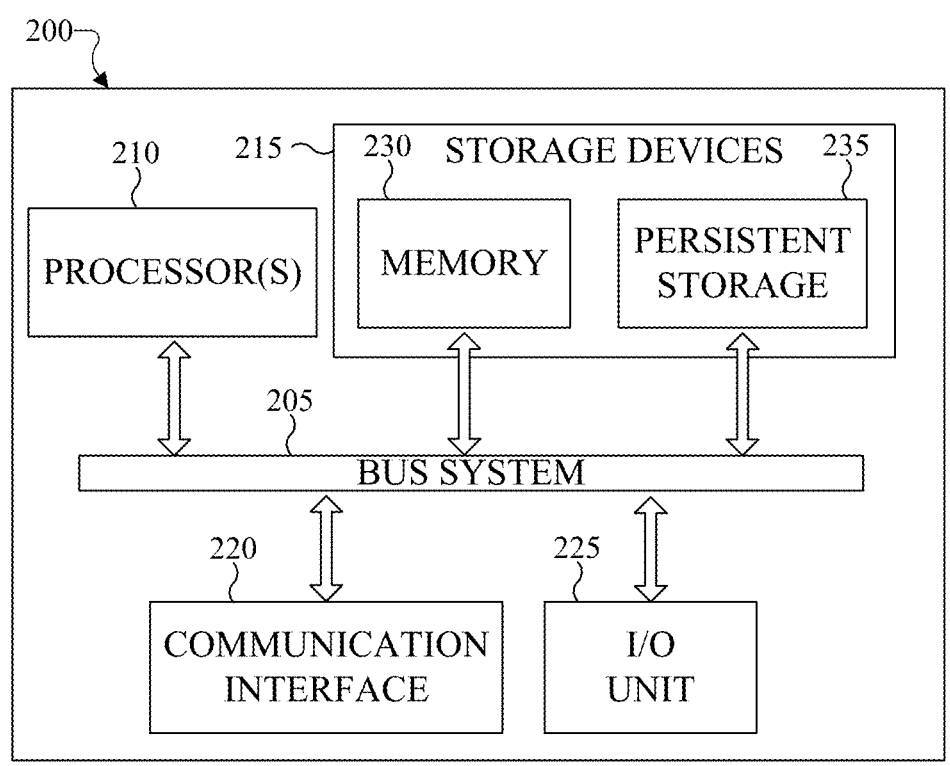
FIGS. 2 and 3 illustrate example electronic devices in accordance with an embodiment of this disclosure.
Figure 3:
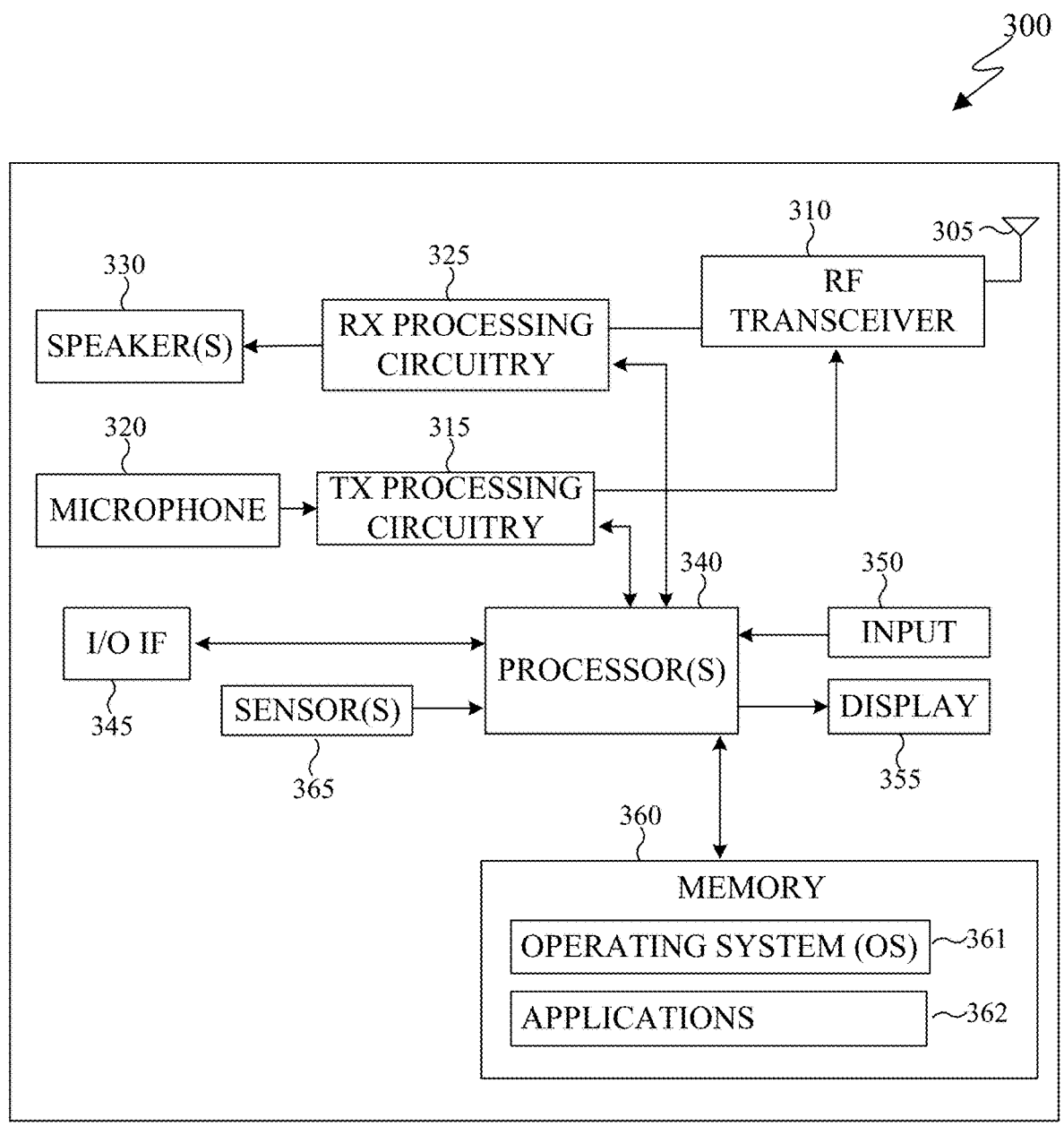

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a 3D point cloud stored within the storage devices 215. In certain embodiments, encoding a 3D point cloud also decodes the 3D point cloud to ensure that when the point cloud is reconstructed, the reconstructed 3D point cloud matches the 3D point cloud prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a virtual object or capture (or record) content through a camera. To transmit the media content to another device, the electronic device 300 can compress and encode the content. When preparing the media content to be transmitted, the electronic device 300 can project the point cloud into multiple patches. For example, a cluster of points of the point cloud can be grouped together and depicted as a patch in a 2D frame. A patch can represent a single attribute of the point cloud, such as geometry, color, and the like. Patches that represent the same attribute can be packed into individual 2D frames, respectively. FIGS. 4A-4C, which are described in greater detail below, illustrate a 3D point cloud that is represented by patches on different frames.

The 2D frames are then encoded to generate a bitstream. The frames can be encoded individually or together. During the encoding process additional content such as metadata, flags, occupancy maps, auxiliary information, and the like can be included in the bitstream. The electronic device 300 can encode the media content to generate a bitstream, such that the bitstream can be transmitted directly to another electronic device or indirectly such as through the network 102 of FIG. 1. Another electronic device, similar to the electronic device 300, can receive a bitstream directly from the electronic device 300 or indirectly such as through the network 102 of FIG. 1.

Similarly, when decoding media content included in a bitstream that represents a 3D point cloud, the electronic device 300 decodes the received bitstream into frames. In certain embodiments, the decoded bitstream also includes an occupancy map. The decoded bitstream can also include one or more flags, or quantization parameter size, auxiliary information, or any combination thereof. A geometry frame can include pixels that indicate geographic coordinates of points of the point cloud in 3D space. Similarly, a color frame can include pixels that indicate the RGB color of each geometric point in 3D space. In certain embodiments, an individual frame can include points from different layers. In certain embodiments, after reconstructing the 3D point cloud, the electronic device 300 can render the 3D point cloud in three dimensions via the display 355.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

FIGS. 4A, 4B, and 4C illustrate an example 3D point cloud and 2D frames that represent the 3D point cloud in accordance with an embodiment of this disclosure. In particular, FIG. 4A illustrates a 3D point cloud 400, and FIGS. 4B and 4C each illustrate a 2D frame that includes patches. The FIG. 4B illustrates a 2D frame 410 that represents the geometric position of points of the 3D point cloud 400. The FIG. 4C illustrates the texture frame 420 that represents the color (or another attribute) associated with points of the 3D point cloud 400. The embodiment of FIGS. 4A, 4B, and 4C, are for illustration only and other embodiments could be used without departing from the scope of this disclosure.

The 3D point cloud 400 is a set of data points in 3D space. Each point of the 3D point cloud 400 includes multiple attributes such as (i) geometric position that provides the structure of the 3D point cloud and (ii) one or more textures that provide information about each point such as color, reflectiveness, material, and the like.

FIGS. 4B and 4C illustrate the 2D frames 410 and 420 respectively. The frame 410, depicts multiple patches (such as a patch 412) representing the depth values of the 3D point cloud 400. The frame 420, depicts multiple patches (such as a patch 422) representing the color of the 3D point cloud 400. Each pixel of color in the frame 420 corresponds to a particular geometry pixel in the frame 410. For example, a mapping is generated between each pixel in the frame 410 and the frame 420. The location of the patches within the 2D frames 410 and 420 can be similar for a single position of the 3D point cloud. For example, as the 3D point cloud 400 changes, new frames can be generated with different patches based on the new position the 3D point cloud.

Although FIGS. 4A, 4B, and 4C illustrate example point cloud and 2D frames representing a point cloud various changes can be made to FIGS. 4A, 4B, and 4C. For example, the point cloud and point mesh represent a single object, whereas in other embodiments, a point cloud or point mesh can represent multiple objects, scenery (such as a landscape), a virtual object in AR, and the like. In another example, the patches included in the 2D frames can represent other textures, such as luminance, material, and the like. FIGS. 4A, 4B, and 4C do not limit this disclosure to any particular 3D object(s) and 2D frames representing the 3D object(s).

Figure 5A:
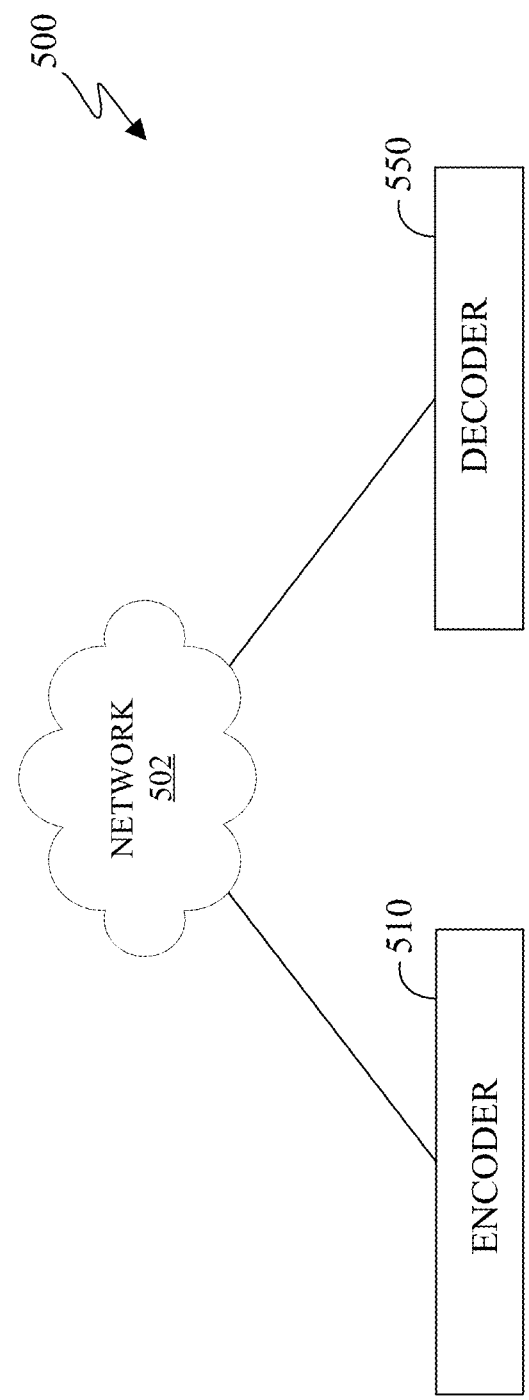
FIG. 5A illustrates a block diagram of an example environment-architecture in accordance with an embodiment of this disclosure.
Figure 5B:
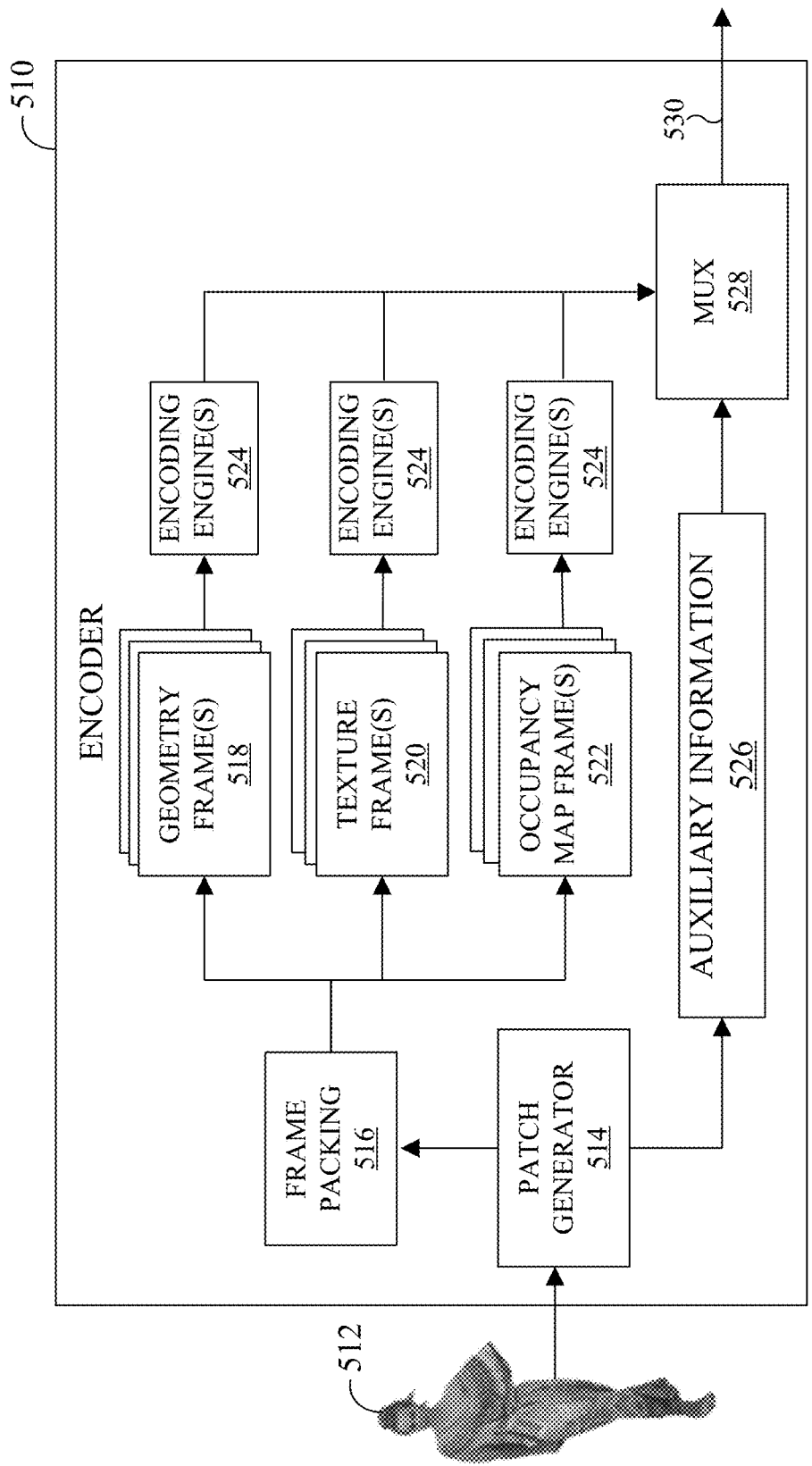
FIG. 5B illustrates an example block diagram of an encoder in accordance with an embodiment of this disclosure.
Figure 5C:
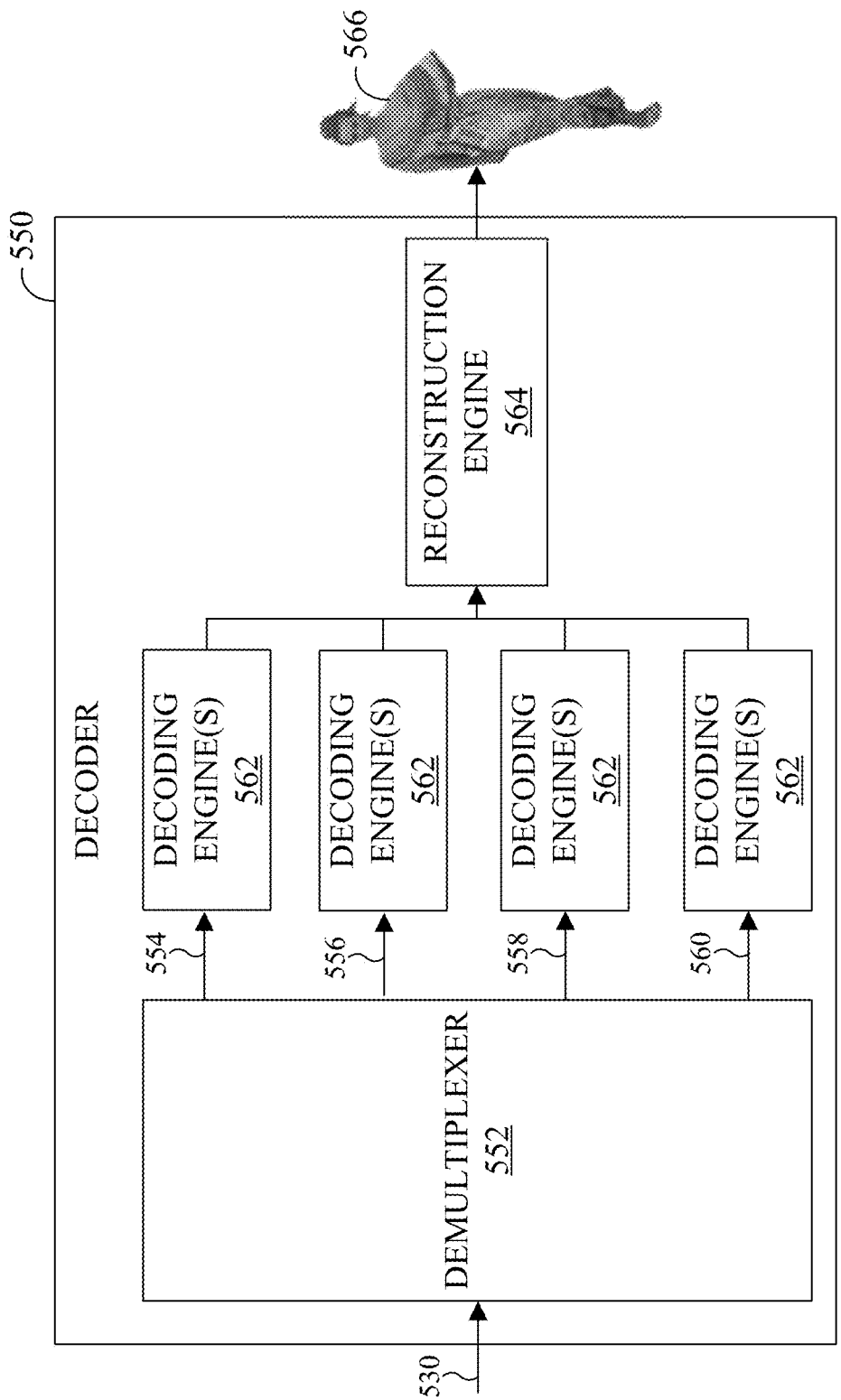
FIG. 5C illustrates an example block diagram of a decoder in accordance with an embodiment of this disclosure.

FIGS. 5A, 5B, and 5C illustrate block diagrams in accordance with an embodiment of this disclosure. In particular, FIG. 5A illustrates a block diagram of an example environment-architecture 500 in accordance with an embodiment of this disclosure. FIG. 5B illustrates an example block diagram of the encoder 510 of FIG. 5A in accordance with an embodiment of this disclosure. FIG. 5C illustrates an example block diagram of the decoder 550 of FIG. 5A in accordance with an embodiment of this disclosure. The embodiments of FIGS. 5A, 5B, and 5C are for illustration only. Other embodiments can be used without departing from the scope of this disclosure.

As shown in FIG. 5A, the example environment-architecture 500 includes an encoder 510 and a decoder 550 in communication over a network 502. The network 502 can be the same as or similar to the network 102 of FIG. 1. In certain embodiments, the network 502 represents a "cloud" of computers interconnected by one or more networks, where the network is a computing system utilizing clustered computers and components that act as a single pool of seamless resources when accessed. Also, in certain embodiments, the network 502 is connected with one or more servers (such as the server 104 of FIG. 1, the server 200), one or more electronic devices (such as the client devices 106-116 of FIG. 1, the electronic device 300), the encoder 510, and the decoder 550. Further, in certain embodiments, the network 502 can be connected to an information repository (not shown) that contains a VR and AR media content that can be encoded by the encoder 510, decoded by the decoder 550, or rendered and displayed on an electronic device.

In certain embodiments, the encoder 510 and the decoder 550 can represent the server 104, one of the client devices 106-116 of FIG. 1, or another suitable device. The encoder 510 and the decoder 550 can include internal components similar to the server 200 of FIG. 2 and electronic device 300 of FIG. 3. In certain embodiments, the encoder 510 and the decoder 550 can be a "cloud" of computers interconnected by one or more networks, where each is a computing system utilizing clustered computers and components to act as a single pool of seamless resources when accessed through the network 502. In some embodiments, a portion of the components included in the encoder 510 or the decoder 550 can be included in different devices, such as multiple servers 104 or 200, multiple client devices 106-116, or other combination of different devices. In certain embodiments, the encoder 510 is operably connected to an electronic device or a server while the decoder 550 is operably connected to an electronic device. In certain embodiments, the encoder 510 and the decoder 550 are the same device or operably connected to the same device.

The encoder 510 receive 3D media content, such as a point cloud, from another device such as a server (similar to the server 104 of FIG. 1, the server 200 of FIG. 2) or an information repository (such as a database). In certain embodiments, the encoder 510 can receive media content from multiple cameras and stitch the content together to generate a 3D scene that includes one or more point clouds. After receiving the content, the encoder 510 projects a content into two dimensions which create patches that represent the projection. The encoder 510 clusters points of a point cloud into groups which are projected onto different planes such as an XY plane, an YZ plane, and an XZ plane. Each cluster of points is represented by a patch when projected onto a plane. It is noted that a point of the 3D point cloud is located in 3D space based on a (X, Y, Z) coordinate value. When the point is projected onto a 2D frame, a pixel representing the projected point, is denoted by the column and row index in the frame indicated by the coordinate (u, v). Additionally, 'u' and 'v' can range from zero to the number of rows or columns in the depth image, respectively. The encoder 510 transmits frames representing the point cloud as an encoded bitstream. The bitstream can be transmitted to an information repository (such as a database) or an electronic device that includes a decoder (such as the decoder 550), or the decoder 550 itself through the network 502. The encoder 510 is described below in FIG. 5B.

The decoder 550 can receive a bitstream that represents media content, such as a point cloud. The bitstreams can include data representing a 3D point cloud. In certain embodiments, the decoder 550 can decode the bitstream that includes the multiple frames and auxiliary information that are used when reconstructing the point cloud. The auxiliary information associated with one frame can indicate that the decoder is to reference auxiliary information from another frame when reconstructing the point cloud. The decoder 550 is described with more below in FIG. 5C.

FIG. 5B illustrates the encoder 510 that generates a bitstream 530 that represent a point cloud 512. The bitstream 530 which can include multiple bitstreams and can be transmitted via the network 502 of FIG. 5A to another device, such as the decoder 550. The encoder 510 includes a patch generator 514, a frame packing 516, various frames (such as one or more geometry frames 518, one or more texture frames 520, and one or more occupancy map frames 522), one or more encoding engines 524, auxiliary information 526, and a multiplexer 534.

The point cloud 512 can be stored in memory (not shown) or received from another electronic device (not shown). The point cloud 512 can be a single 3D object, or a grouping of 3D objects. The point cloud 512 can be stationary object or an object which moves.

The patch generator 514 generates patches by taking projections of the point cloud 512. In certain embodiments, the patch generator 514 splits the geometry attribute and each texture attribute of each point of the point cloud 512. The patch generator 514 can use two or more projection planes, to cluster the points of the point cloud 512 to generate the patches. For each input point cloud, such as the point cloud 512, the geometry attribute and one or more texture attributes (such as color) are clustered using one or more criteria. The criteria include a normal direction, a distance to projected frames, contiguity, and the like. After the points are clustered, the geometry attribute and a corresponding texture attribute for each point are projected onto planes, such as the XY plane, the YZ plane, or the XZ plane.

When projected, each cluster of points of the point cloud 512 appears as patch. Each a patch (also referred to as a regular patch) represents a particular attribute of the point cloud. For example, a single cluster of points can be represented as a single patch on different frames, where each patch represents a different attribute of the single cluster of points. It is noted that patches representing different attributes of the same cluster of points include a correspondence or a mapping, such that a pixel in one patch corresponds to the same pixel in another patch. In certain embodiments, the pixels representing geometry are packed into one frame, such as the geometry frames 518, and the pixels representing texture are packed into another frame, such as the texture frames 520.

The frame packing 516 sorts and packs the patches (both the geometry and texture patches) into respective frames, such as the geometry frames 518 and the texture frames 520. As illustrated in FIGS. 4B and 4C, the frame packing 516 organizes the by attributes and places the patches within corresponding frames, such as the patch 412 is included in the geometry frame 410 and the patch 422 is included in the texture frame 420. The frame packing 516 also generates one or more occupancy map frames 522 based on the placement of the patches within the geometry frames 518 and the texture frames 520.

The geometry frames 518 (as illustrated by the geometry frames 410 of FIG. 4B) include pixels which represent the geographic location of each point of the point cloud 512. The location of the pixels in the geometry frame 518 represents the geometry values of the point cloud 512. The pixels representing the geometry values of the point cloud 512 are grouped into patches that represent a cluster of points of the point cloud 512.

The texture frames 520 (as illustrated by the texture frame 420 of FIG. 4C) represent a single attribute of the point cloud 512, such as color. The texture frames 520 include pixels representing values of a particular texture of the point cloud 512. The pixels representing the texture values of the point cloud 512 are grouped into patches that represent a cluster of points of the point cloud 512.

The occupancy map frames 522 represent occupancy maps that indicate the valid pixel location in the frames (such as the geometry frames 518 and the texture frames 520) and the invalid pixel locations in the frames. The valid pixels correspond to actual points of the 3D point cloud 512 which are projected into patches (via the patch generator 514) and packed into respective frames (via the frame packing 516). A valid pixel at location (u,v) on the occupancy map indicates a pixel on at location (u,v) of the geometry frame 518 and a pixel on at location (u,v) of texture frame 520 represent a point of the point cloud. An invalid pixel at location (u,v) on the occupancy map indicates a pixel on at location (u,v) of the geometry frame 518 and a pixel on at location (u,v) of texture frame 520 do not represent a point of the point cloud. In certain embodiments, one of the occupancy map frames 522 can correspond to the both a geometry frame 518 and a texture frame 520. In other embodiments, the one of the occupancy map frames 522 correspond to one of the geometry frames 518 and another one of the occupancy map frames 522 corresponds to one of the texture frames 520.

The encoding engines 524 encode the geometry frames 518, the texture frames 520, and the occupancy map frames 522. In certain embodiments, the frames (such as the geometry frames 518, the texture frames 520, and the occupancy map frames 522) are encoded by independent encoders. For example, one encoding engine 524 can encode the geometry frames 518, another encoding engine 524 can encode the texture frames 520, and yet another encoding engine 524 can encode the occupancy map frames 522. In certain embodiments, the encoding engines 524 can be configured to support an 8-bit, a 10-bit, a 12-bit, a 14-bit, or a 16-bit, precision of data. The encoding engine 524 can be a video or image codec such as HEVC, AVC, VP9, VP8, JVNET, and the like to compress the 2D frames representing the 3D point cloud.

The auxiliary information 526 includes information describing the patches. For each patch, the auxiliary information 526 can include the height, width, position on the 2D frame, position in 3D space projection direction, and the like. Such information can be expressed as patch_u0, patch_v0, patch_u1, patch_v1, patch_d1, respectively. For example, the auxiliary information 526 includes an X-offset and a Y-offset. In certain embodiments, the auxiliary information 526 is compressed before being multiplexed into the bitstream 530.

Sending the auxiliary information 526 for each patch generally consumes lots of information. For example, the height, the width, the position on the 2D frame, the position in 3D space projection direction, is associated with each patch of each frame. Therefore, embodiments of the present disclosure provide systems and methods for reducing the quantity of data included in the auxiliary information 526. In certain embodiments, the auxiliary information is modified such that instead of transmitting the patch information (such as size and position) of every patch, the encoder 510 identifies whether any patches within a current frame match patches in a previous frame. For example, the encoder 510 generates a correspondence between patches of the current frame that match patches of a previous frame. The previous frame is referred to as a reference frame or a reference patch frame and is previously generated by the patch generator 514 and the frame packing 516. In certain embodiments, a current frame is the frame that is currently being generated by the patch generator 514 and the frame packing 516.

When a patch in the current frame matches a patch in a previous frame, the auxiliary information 526 associated with the patch in the current frame can simply reference the auxiliary information 526 of a patch in the previous frame, to predict the auxiliary information efficiently. Then only the difference between the predicted information and the actual auxiliary information needs to be coded in the bitstream. By using the auxiliary information 526 associated with a patch from a previous frame for prediction, the total information that is transmitted in the bitstream is reduced.

If at least one patch included in the current frame matches a patch in a previous frame, the encoder 510 separates the patches in the current frame into two groups. Patches of the current frame that match patches of the previous frame are identified as matched patches, and patches of the current frame that do not match patches of the previous frame are identified as unmatched patches. Once patches of the current frame match patches of the reference frame, the patches of the current frame are reordered.

For example, for every patch in the previous frame, the closest matching patch from the current frame is identified. The closest matching patch is identified based on a distance threshold. For each matched patch identified, the patch is placed at the next position in the matched patches list (or grouping), while the unmatched patches from the current frame are placed in the unmatched group (or grouping).

The multiplexer 534 combines the multiple frames (such as the geometry frames 518, the texture frames 520, and the occupancy map frames 522) which are encoded, to create a bitstream 530.

FIG. 5C illustrates the decoder 550 that includes a demultiplexer 552, one or more decoding engines 562, and a reconstruction engine 564. The decoder 550 receives a bitstream 530, such as the bitstream that was generated by the encoder 510. The demultiplexer 552 separates bitstream 530 into one or more bitstreams representing the different frames. For example, the demultiplexer 552 separates various streams of data such as the geometry frame information 554 (originally the geometry frames 518 of FIG. 5B), texture frame information 556 (originally the texture frames 520 of FIG. 5B), the occupancy map information 558 (originally the occupancy map frames 522 of FIG. 5B), and the auxiliary information 560 (originally the auxiliary information 526 of FIG. 5B).

The decoding engines 562 decode the geometry frame information 554 to generate the geometry frames 518. The decoding engines 562 decode the texture frame information 556 to generate the texture frames 520. Similarly, the decoding engines 562 decode the occupancy map information 558 to generate the occupancy map frames 522. The decoding engines 562 also decode the auxiliary information 560 to generate the auxiliary information 526. In certain embodiments, a single decoding engine 562 decodes the geometry frame information 554, the texture frame information 556, and the occupancy map information 558.

In certain embodiments, when the auxiliary information 560 is decoded (or decompressed) by the decoding engine 562, the patch information for each patch included in a current frame is identified. The decoding engine 562 can identify whether a patch included in a current frame of the geometry frames 518 or a frame included in the texture frames 520 is an intra patch or an inter patch. For a patch identified as an intra patch, the decoding engine 562 determines that the patch information is included explicitly in the auxiliary information of the current frame or predicted from a previous patch of the current frame.

After the geometry frame information 554, the texture frame information 556, the occupancy map information 558 are decoded and the auxiliary information 560 for the patch in the current frame is predicted, the reconstruction engine 564 generates a reconstructed point cloud 566. The first frame can represent the geometry frame information 554, the second frame can represent the texture frame information, or another feature of the point cloud. The reconstructed point cloud 566 is similar to the point cloud 512.

Although FIGS. 5A-5C illustrates one example of a transmitting a point cloud various changes may be made to FIG. 5A-5C. For example, additional components can be included in the encoder 510 and the decoder 550.

Figure 6:
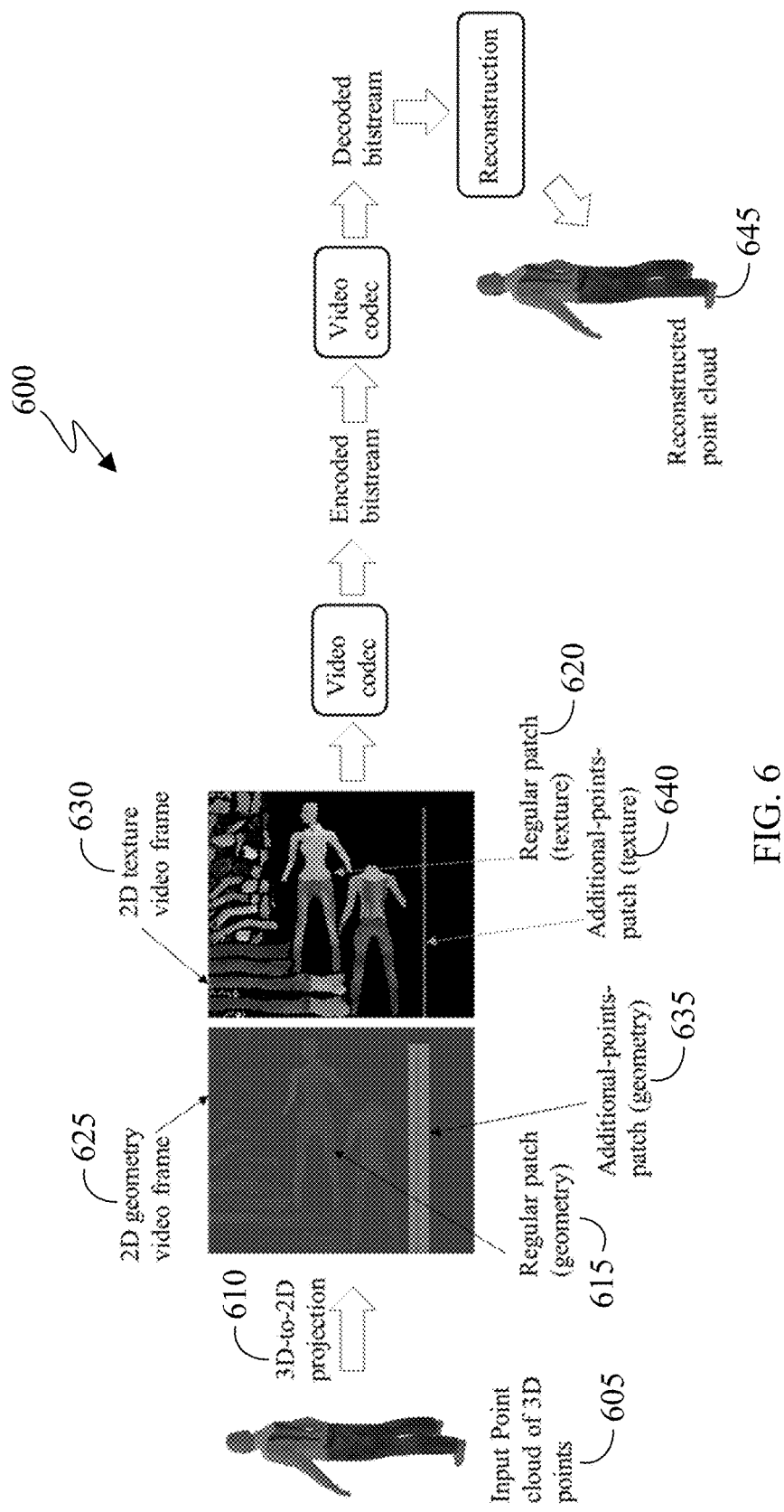
FIG. 6 illustrates an example high-level encoding and decoding of 3D points clouds using video-based point cloud compression systems in accordance with an embodiment of this disclosure.

FIG. 6 illustrates an example high-level encoding and decoding process 600 of 3D points clouds using video-based point cloud compression systems in accordance with an embodiment of this disclosure. The embodiment of FIG. 6 is for illustration only and other embodiments could be used without departing from the scope of this disclosure.

An input point cloud 605 of 3D points is received by the compression systems and the 3D to 2D projection 610 generates a set of patches, both a geometry patch 615 and an attribute (e.g. color) patch 620, which are arranged in a set of a geometry frame 625 and an attribute frame 630, respectively. This 3D to 2D projection 610 is repeated until the point cloud 605 is broken down into a plurality of sets of patches. In other words, the 3D to 2D projection 610 is repeated until the plurality of sets of patches represents enough of the point cloud 605 to be reproduced.

The patches can be packed in the video frame 625, 630. Sometimes the dimensions, either height or width or both, of one or more patches 615, 620 may exceed the pre-selected dimension of the video frames 625, 630. In such cases, the video frame sizes are usually required to be increased to accommodate those patches. Increasing the video frame size results in an increase in the encoded bitstream-size, which is undesirable. Additionally, an increase in the video frame size results in a proportional increase in both encoder and decoder complexity. On the other hand, for video-based point cloud compression systems, this increase in complexity due to increase in video fame size does not provide any useful gains since a large portion of the video frames, the inter-patch regions, are either empty or do not contain any useful information about the actual 3D points (please refer to the geometry and texture video frames in FIGS. 4B, 4C and 6). Nevertheless, the video decoder needs to decode the entire video frame including these inter-patch regions. Moreover, the presence of such patches results in inefficient packing and utilization of the video frame space.

Furthermore, in video-based point cloud compressions systems such as the MPEG-I V-PCC, points from the 3D point cloud are orthogonally projected onto the six or more faces of an imaginary cuboid surrounding the 3D object. As a result of such projection, two out of the three x, y, z coordinates correspond to the 2D pixel location in the video frame at which the point is projected. Therefore, due to the possible geometry range, the dimensions (size) of the patches are also, in part, determined by the bit-depth of the point cloud input to the system. For example, the patches generated by projecting a point cloud whose geometry is represented by 12-bits (for each coordinate) tend to be larger than the patches generated by projecting a point cloud whose geometry is represented by 10-bits per coordinate. Indeed, while the largest possible patch from a 10-bit (geometry) point cloud in V-PCC can extend up to 1024 pixels along one or both of the horizontal and vertical directions, the largest possible patch from a 12-bit (geometry) input point cloud in V-PCC can extend up to 4096 pixels in one or both of the horizontal and vertical directions.

The present disclosure seeks to improve the compactness (or tightness) of patch packing in the video frames and, either reduce or limit the video frame dimension by splitting the large patches into one or more smaller patches which can fit together more compactly in the video frame with the other smaller patches.

In certain embodiments of this disclosure, the decision of whether to split a patch, where to split the patch and the patch splitting operation itself is carried out immediately following the initial creation of the patches during point cloud segmentation and 3D-to-2D projection in V-PCC.

In certain embodiments of this disclosure, the decision of whether to split a patch is made based on the dimension of the patch in the projected 2D space (dimensions along the tangential and bitangential axes in V-PCC) relative to the pre-set or desired video frame dimension. More specifically, if the relative dimension of the patch along the tangential and/or bitangential axes is greater than a threshold value (threshold >0), then the patch is split along that direction. In certain embodiments, if the patch in the projected 2D space exceeds a preset number of pixels along any one of the two dimensions, the patch is split along that dimension or both dimensions. For example, let us suppose that the preset video frame height and width, when encoding a 10-bit geometry point cloud, are 1280 and 1280 pixels respectively. Then, if the size of a newly generated patch exceeds a threshold of 512 pixels along any dimension, then the patch is split resulting in two smaller patches.

Although any value of threshold (>0) may be chosen, for V-PCC-like codecs that employ a grid to arrange patches in the video frame, it might be desirable to choose a value for the threshold that is an integer multiple of the grid size. For example, V-PCC divides the video frames into grids of size occupancyResolution× occupancyResolution. The occupancyResolution in V-PCC is the minimum unit of block (or grid) size in the video frame that belongs to a unique patch. In other words, pixels from two different blocks cannot occupy the same occupancyResolution× occupancyResolution block. Therefore, in V-PCC it can be desirable to choose a threshold value that is an integer multiple of the occupancyResolution.

In certain embodiments, the threshold value of the number of pixels is a function of the bit-depth of the geometry information of the input point cloud. For example, if an 11-bit (geometry) point cloud is being encoded, and the video frame height and width are set to 1280 pixels along each dimension, then a threshold of 768 pixels may be chosen (in lieu of 512 pixels used for the 10-bit point cloud example). The larger threshold can accommodate larger size patches, which are generally better from video coding perspective, and yet be smaller than the frame size set for the video frame.

In certain embodiments, the threshold value of the number of pixels can be determined by (or is a function/combination) of one or more of the following parameters: the bit-depth of data, the relative smoothness of the region in the patch where the cut (split) is to be made, the optimum video frame dimension of the specific video codec being used (if any), the target application and the target device in which the final reconstructed point cloud 645 is expected to be rendered. Due to the multitude of well-developed tools and techniques available for splitting 2D images and the relative simplicity of cutting 2D patches, splitting the patches in 2D space is preferred. The high-level process of patch-splitting in 2D space is shown in the flowchart in FIG. 7.

Figure 8:
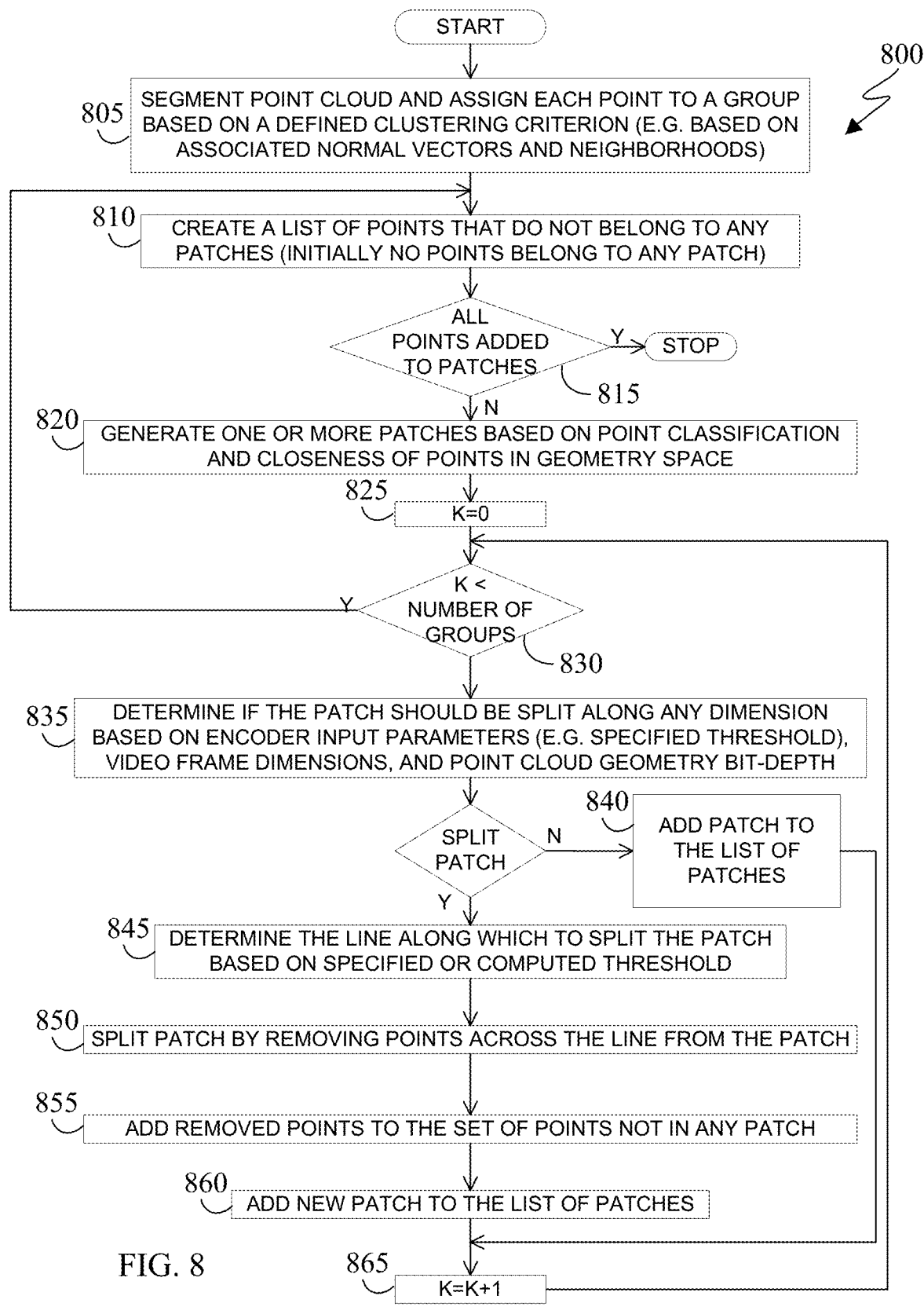

In certain embodiments of patch splitting in 2D space, the points are first assigned to different clusters, usually based on direction/plane of projection. Then, an initial set of patches (connected components) is generated based on the cluster numbers and the proximity of the points in 3D space. Then, for each patch in the list, a determination is made whether to split the patch or not. This decision is either based on one or more input parameters at the encoder such as a binary flag to turn on/off patch splitting and/or a threshold, in pixels, to specify when to split a patch. If yes, the patch is split into two groups—the first group consisting of points from the smaller (relative to the initial) patch and the second group consisting of points removed from the patch. While the newly generated smaller patch is added to the final list of patches, the points from the other group, which were removed due to splitting are added back to a list of points not belonging to any patches. In subsequent iterations, these points along with other points that do not belong to any patch are reconsidered for the generation of new patches. This process of patch splitting in the exemplary embodiment is shown in FIG. 8.

Figure 7:
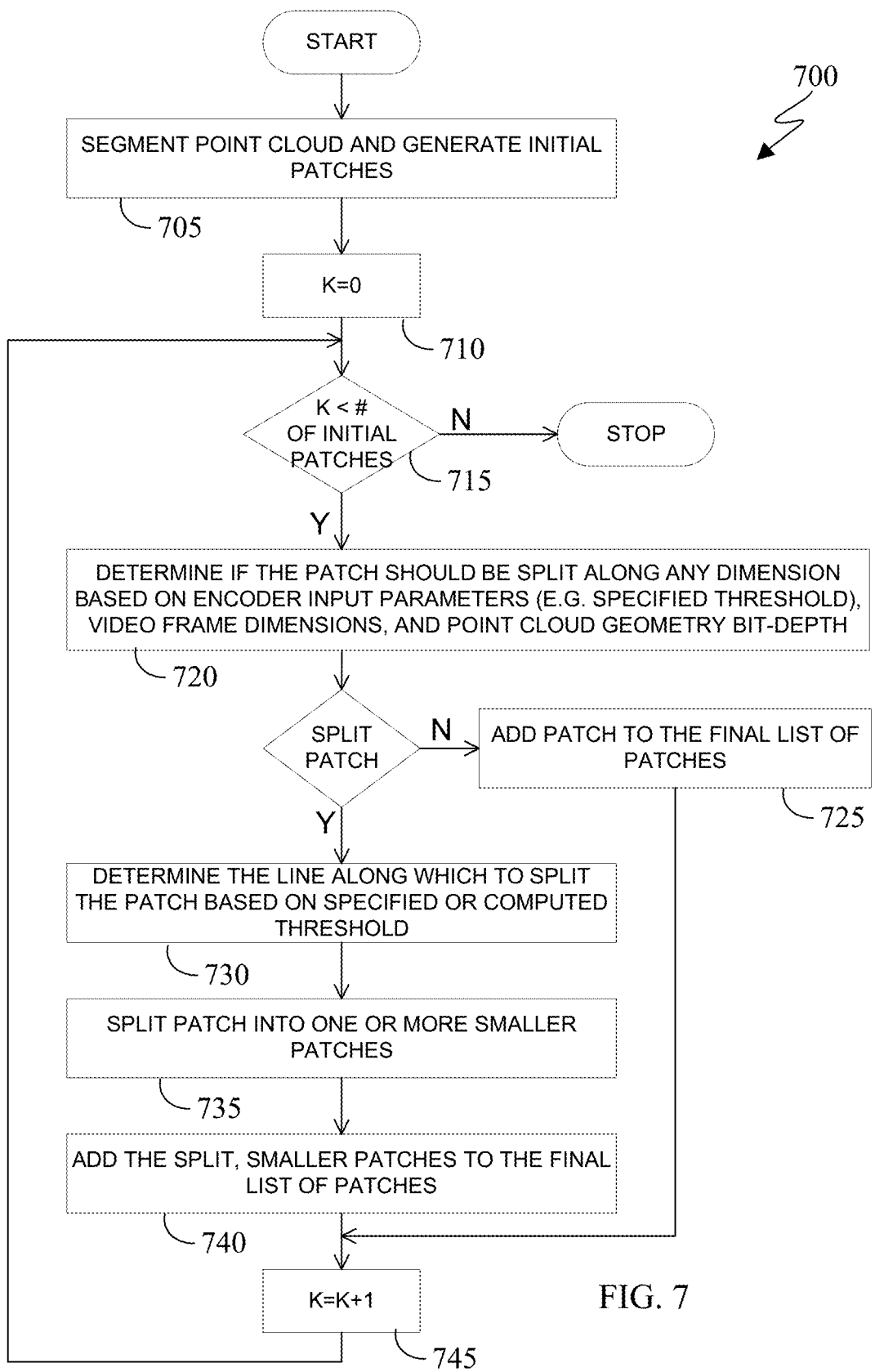
FIGS. 7 and 8 illustrate examples of high-level processes of patch-splitting in 2D space in accordance with embodiments of this disclosure.

FIG. 7 illustrates an example of high-level processes of patch-splitting in 2D space in accordance with embodiments of this disclosure. The process 700 can be performed by the server 104 or any of the client devices 106-116 of FIG. 1, the server 200 of FIG. 2, the electronic device 300 of FIG. 3, the encoder 510 of FIGS. 5A and 5B, or any other suitable device or system. For ease of explanation, the process 700 is described as being performed by the encoder 510 of FIGS. 5A and 5C.

In operation 705, the encoder 510 can segment a point cloud and generate a set of initial patches. The set of initial patches can include corresponding patches for a geometric frame and a texture frame. As the initialization for encoding the point cloud, a counter (K) is set to zero (operation 710).

In operation 715, the encoder 510 can determine if the counter is less than a number of the initial patches generated. If the counter is less than the number of initial patches, the process proceeds to operation 720.

In operation 720, the encoder 510 can determine whether the patch should be split along any dimension based on encoder input parameters, video frame dimensions, and point cloud geometry bit-depth. The split is determined based on a dimension exceeding a threshold for the encoder input parameters. When the patch is to be split, the process 700 proceeds to operation 730. When the patch does not need to be further split, the process 700 proceeds to operation 725.

In operation 725, the encoder 510 can add the patch to a final list of patches. The final list of patches can be used by the decoder 550 when rebuilding the point cloud.

In operation 730, the encoder 510 can determine a line along which to split the patch based on a specified or computed threshold. The line can be determined based on texture, depth, materials, etc. In operation 735, the encoder 510 can split the patch into one or more smaller patches or sub-patches. In operation 740, the encoder 510 can add the smaller patches that had been split to the final list of patches. In operation 745, the encoder 510 can increment the counter by one.

The encoder 510 can determine that the initial patches have been fully processed when the counter is not less than the number of initial patches in operation 715. Once each patch is processed for determining further splitting into sub-patches, the process 700 ends.

FIG. 8 illustrates an example of high-level processes of patch-splitting in 2D space in accordance with embodiments of this disclosure. The process 800 can be performed by the server 104 or any of the client devices 106-116 of FIG. 1, the server 200 of FIG. 2, the electronic device 300 of FIG. 3, the encoder 510 of FIGS. 5A and 5B, or any other suitable device or system. For ease of explanation, the process 800 is described as being performed by the encoder 510 of FIGS. 5A and 5C.

In operation 805, the encoder 510 can segment a point cloud and assign each point to a group based on a defined clustering criterion. The assignment can be based on associated normal vectors and neighborhoods.

In operation 810, the encoder 510 can create a list of points that do not belong to any patches. Initially, no points belong to any patches. In operation 815, the encoder 510 can determine whether all points are added to a patch. When all the points are added to patches, the process 800 ends.

In operation 820, the encoder 510 can generate one or more patches based on a point classification and closeness of points in geometry. The set of initial patches can include corresponding patches for a geometric frame and a texture frame. As the initialization for encoding the point cloud, a counter (K) is set to zero (operation 825).

In operation 830, the encoder 510 can determine if the counter is less than a number of groups. If the counter is less than the number of groups, the process proceeds to operation 835.

In operation 835, the encoder 510 can determine whether the patch should be split along any dimension based on encoder input parameters, video frame dimensions, and point cloud geometry bit-depth. The split is determined based on a dimension exceeding a threshold for the encoder input parameters. When the patch is to be split, the process 800 proceeds to operation 845. When the patch does not need to be further split, the process 800 proceeds to operation 840, adding the patch to the list of patches, and operation 865, to increment the counter by one.

In operation 845, the encoder 510 can determine a line along which to split the patch based on a specified or computed threshold. The line can be determined based on texture, depth, materials, etc. In operation 850, the encoder 510 can split the patch by removing points across the line from the patch. In operation 855, the encoder can add any removed points to the set or list of points that do not belong to any patches.

In operation 860, the encoder 510 can add the one or more smaller patches that had been split to the final list of patches. In operation 865, the encoder 510 can increment the counter by one.

The encoder 510 can determine that the initial patches have been fully processed when the counter is not less than the number of initial patches in operation 815. Once each patch is processed for determining further splitting into sub-patches, the process 800 ends.

Figures 9A, 9B:
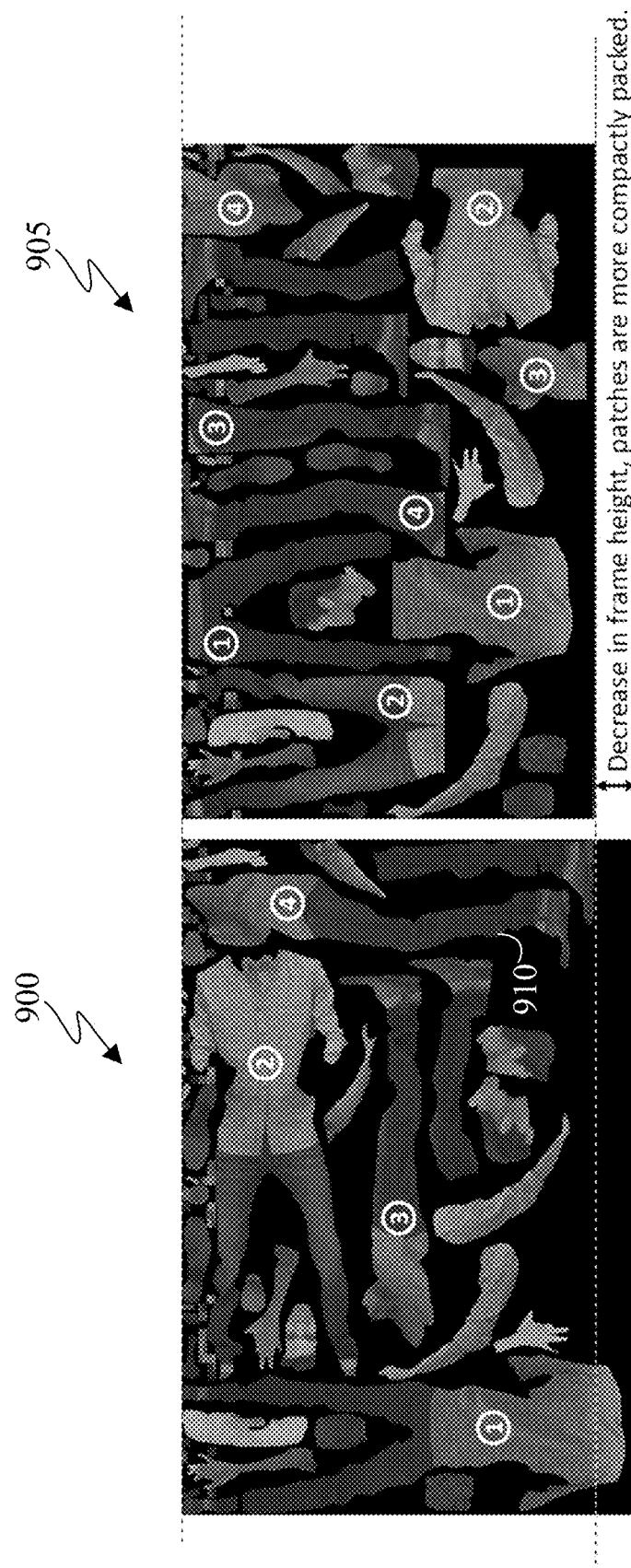
FIGS. 9A and 9B illustrate examples of texture packing before and after patch splitting in accordance with embodiments of this disclosure.

FIGS. 9A and 9B illustrate examples of texture packing before patch splitting 900 and after patch splitting 905 in accordance with embodiments of this disclosure. The embodiment of FIGS. 9A and 9B are for illustration only and other embodiments could be used without departing from the scope of this disclosure.

FIG. 9A shows the set of patches 910 (these are the texture patches in the texture video frames corresponding to the geometry patches in the geometry video frame) initially obtained after projecting the points from 3D space to 2D space of a point cloud frame. The four large patches are identified (numbered 1 to 4) in the FIG. 9A. FIG. 9B shows the patches after splitting the four patches (1-4) into smaller patches. The split patches are identified in the image based on the original of the four patches generated from. Note that a more compact packing can be obtained after splitting the patches as described in the exemplary embodiment. The frame height is reduced in the after-patch splitting frame from the before path splitting frame.

Figure 10:
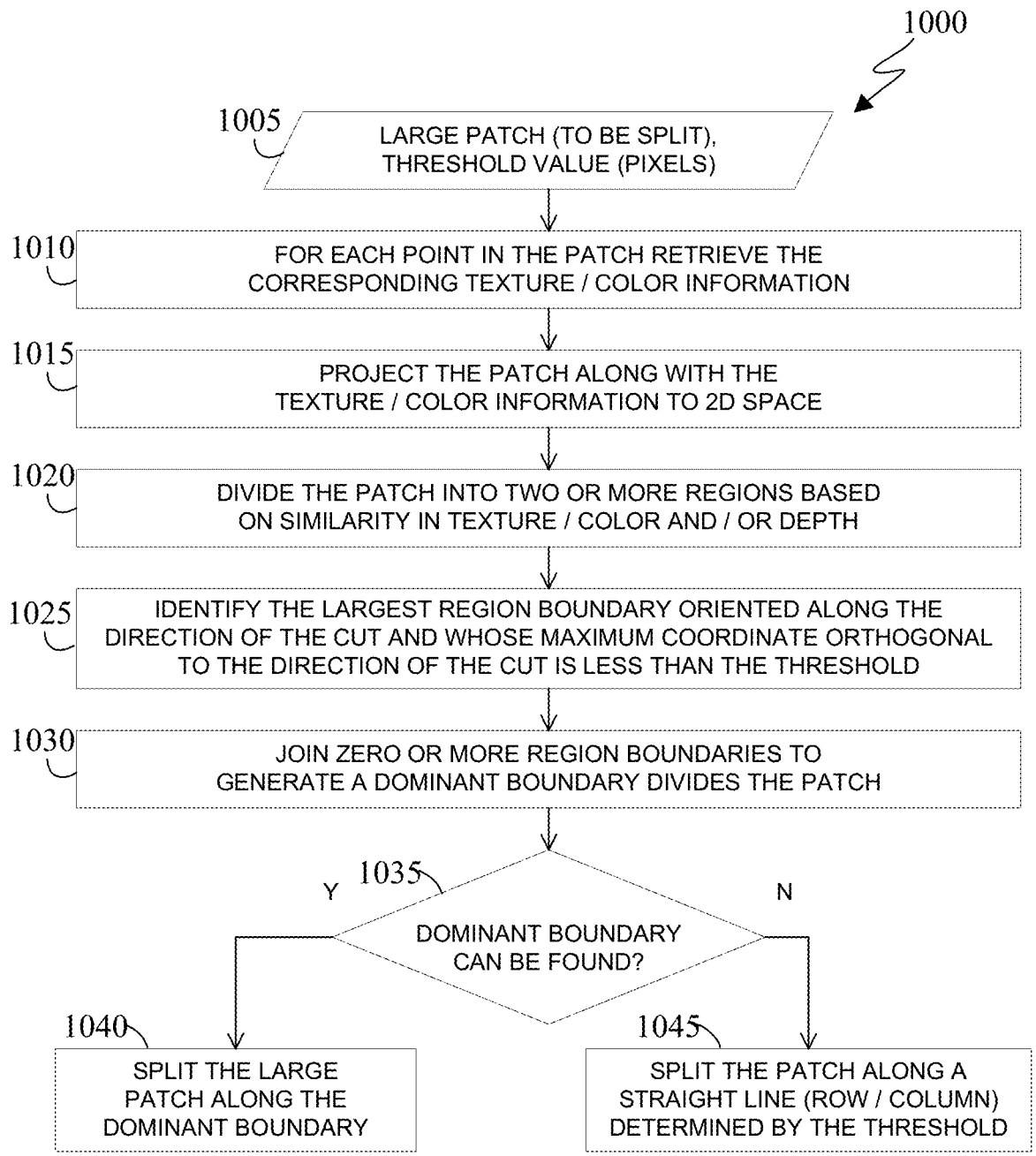
FIG. 10 illustrates an example patch splitting method in accordance with embodiments of this disclosure.

FIG. 10 illustrates an example patch splitting process 1000 in accordance with embodiments of this disclosure. The process 1000 can be performed by the server 104 or any of the client devices 106-116 of FIG. 1, the server 200 of FIG. 2, the electronic device 300 of FIG. 3, the encoder 510 of FIGS. 5A and 5B, or any other suitable device or system. For ease of explanation, the process 1000 is described as being performed by the encoder 510 of FIGS. 5A and 5C.

In operation 1005, the encoder 510 can determine a large patch to be split based on a threshold value. The determination of the large patch can be made based on a dimension of the patch exceeding a dimension threshold. For example, a distance dimension could exceed the maximum distance dimension and the patch would be considered for patch splitting.

In operation 1010, the encoder 510 can retrieve corresponding texture and color information for each point in the large patch. The texture and color of the patch could be retrieved from a memory or read from an initial point cloud.

In operation 1015, the encoder 510 can project the large patch along with the texture and/or color information to a 2D space. Difference in texture and color could be identified accordingly. For color information, the respective colors could be displayed. For texture information, a color could be assigned to different textures, or a gray scale could be applied for differing textures.

In operation 1020, the encoder 510 can divide the large patch into two or more regions based on a similarity in a detail of the points. The encoder 510 can determine that the large patch needs to be split into a number of sub patches or divided patches based on a specific feature, such as texture, geometry, depth, etc. The encoder 510 can also determine that the divided patches are to be determined based on a combination of features.

In operation 1025, the encoder 510 can identify the largest region boundary oriented along a direction of the cut and whose maximum coordinate orthogonal to the direction of the cut is less than a threshold. The boundary can be determined based on splitting the patch in an orthogonal or perpendicular boundary to the dimension that has exceeded the threshold. For example, when the height is over the height threshold, the major boundary will be determined in the width direction. The boundary regions can also be identified based on proximity to a midpoint of the violated dimension threshold. The boundary region can also be identified based on boundary lines closes to the dimension threshold.

In operation 1030, the encoder 510 can join a zero or more region boundaries to generate a dominant boundary that divides the large patch. For a patch that has points that extend in different directions with a "zero region" connecting two boundary lines, the boundary lines can be considered in combination with the zero region for splitting the large patch. An example of this can be seen in FIGS. 11A-11E. Once the top portion of the patch (the shirt) is split from the remaining portion of the patch, the bottom portion of the patch (the pants) may still be greater than the threshold. The boundary lines toward the top of the pants are jumbled and not ideal for splitting based on location. The closer the boundaries are to the beginning or ending edges in the direction of the dimension that exceeds the threshold the greater likelihood of requiring more divisions of the patch. Therefore, the encoder 510 can determine that the boundaries around the location where the knees would be located is best, even though there is negative space between the two leg portions.

In operation 1035, the encoder 510 can determine whether a dominate boundary can be found in the large patch. When the dominate boundary can be determined, the process 1000 proceeds to operation 1040. When the dominate boundary cannot be determined, the process 1000 proceeds to operation 1045.

In operation 1040, the encoder 510 can split the large patch along the dominant boundary. The large patch is split into at least two sub patches and the sub-patches are re-processed to ensure that the dimension that was violated is not violated for any of the sub-patches. The sub-patches are also compared to any other remaining dimension thresholds to ensure multiple thresholds were not violated.

In operation 1045, the encoder 510 can split the patch along a straight line determined by the threshold. When a dominant boundary cannot be identified, the large patch can be split at the dimension threshold or a predetermined dimension within the threshold.

FIGS. 11A, 11B, 11C, 11D, and 11E illustrate example patching splitting between a straight line and a dominant boundary in accordance with embodiments of this disclosure. The embodiment of FIGS. 11A, 11B, 11C, 11D, and 11E are for illustration only and other embodiments could be used without departing from the scope of this disclosure.

Once a decision is made to split a large patch 1105 based on exceeding a dimension threshold 1110 (i.e., if the patch 1105 exceeds the video frame dimensions or exceeds the computed or preset maximum patch size threshold), the patch 1105 is split along a straight line represented by the row and/or column of pixels depending on the direction of the split. The row and/or column along which to split the patch 1105 is determined by the threshold 1110. In the simplest case, the row and/or column number along which the patch 1105 is split is equal to the specified or computed threshold 1110 (in pixel units) as shown in FIG. 11A. Such a split and the resulting patch 1115 is shown in FIG. 11B.

Once a decision is made to split a large patch 1105 based on exceeding a dimension threshold 1110 (i.e., if the patch exceeds the video frame dimensions or exceeds the computed or preset maximum patch size threshold), the patch splitting algorithm looks for a dominant boundary 1125 in the patch that is further from one of the roughly parallel edges of the patch by at least the minimum value. A texture boundary represents a texture discontinuity. A dominant boundary 1125 is the longest boundary within the pool of candidate boundaries 1120 and running along the direction of the cut (generally perpendicular to the direction in which the patch size exceeds the dimension threshold 1110). If the dominant boundary 1125 runs completely across the patch (from one edge of the patch to the other), then the patch is divided into two along the dominant boundary 1125. Else, if the dominant boundary 1125 does not completely run across the patch 1105, then a set of patch boundaries 1120 are found that are connected to the dominant boundary 1125 (and running generally along the same direction), and a dominant boundary 1125 is found amongst those boundaries. This boundary is then connected (augmented) to the previously found dominant boundary forming a longer dominant boundary. This process of searching and connecting (augmenting) to the dominant boundary is repeated till a cut-line (doesn't need to be straight) is found that runs across the large patch 1105. Then the patch 1105 is split along the dominant boundary 1125. In certain embodiments, the "minimum value" described above could be the threshold value in pixels. In certain embodiments, the "minimum value" could be the difference between the patch size and the video frame dimension along the direction in which the patch size exceeds.

In certain embodiments, the decision to divide a patch and the patch splitting operation is carried out in 3D space following the completion of the initial clustering of the points in the point cloud. For example, if the 3D bounding box associated with a patch is larger than an acceptable value along any of the dimensions, then the patch 1105 is divided into one or more smaller patches. The 3D bounding box is an imaginary rectangular box that encloses all the points in the patch in 3D space. Its dimensions are determined by the maximum and minimum values of the three coordinates across all the points belonging to the patch.

In certain embodiments of this disclosure, the decision of whether to split a patch and the operation of patch splitting is done at the stage of frame packing 516 the patches in the video frame. Like before, it is possible that the dimensions of one or more patches are larger than the preset dimensions of the video frame. Therefore, it is necessary to split such patches in order to pack them in the video frame. In certain embodiments, the larger size patches are split if their dimension (along horizontal and/or vertical directions) is greater than a threshold value (in terms of the number of pixels). In another embodiment, like before, the patches are split during the patch packing stage if the relative height and/or width of said patches are larger than a threshold value (>0).

In certain embodiments, if a patch cannot fit within the preset video frame height and width due to the placement of the previous patches, the patch 1105 is split into smaller patches to avoid resizing of the video frame.

In embodiments where the large patches are split during patch-packing, a given large patch may be split only if it cannot be packed into the existing space in the video frame (without increasing the size of the video frame) following the arrangement of other patches before the given patch in the list of patches.

In certain embodiments, the sizes of all the patches generated initially (during patch segmentation and generation, by projecting the points from 3D-to-2D) are less than the dimensions of the video frames. However, the main motivation for splitting the patches is to optimally pack the patches in the video frames such that the patches can be tightly arranged occupying minimal space. A secondary motivation for splitting the patches at the stage of patch packing is to improve the spatial and/or temporal correlation between the patches in the packed videos. The spatial correlation is a measure of how similar (in terms of values) neighboring patches are within a video frame, especially near the patch boundaries. The temporal correlation is a measure of how similar patches are in the same location in the video frame across multiple video frames. A high spatio-temporal correlation results in improved performance in video coding of the point clouds. Sometimes, splitting one or more patches during patch-packing in order to improve the spatial correlation may be detrimental to the temporal correlation, and vice-versa. Therefore, a decision must be made at the encoder on how aggressively to split patches for increasing one or both types of correlations. Moreover, splitting the patches only to improve one or both correlations comes at the expense of increased complexity—both temporal and processing—at the encoder. Therefore, it may not be preferable to split patches during patch packing for the goal of improving spatio-temporal correlation of patches.

Some point clouds may also contain a material-id (material identifier) as an attribute attached to every point to designate the material associated with the point. As an example, consider a simple point cloud of a human wearing a blue shirt and a beige color trousers. For this point cloud, all points that represent the human body (arms, face, any other exposed skin portion, etc.) may be assigned a specific material-id. Similarly, the points belonging to the shirt and the trousers may be assigned different material-ids. These material-ids, along with associated meta-data or material information, may be used to optimize the renderer process.

In certain embodiments, wherein a material-id attribute is available for every point, the patch splitting, whether during the patch segmentation and generation, or at a later stage during patch packing, utilizes the material-id information. More specifically, if a given patch's dimension is either greater than the preset video frame dimension or greater than a threshold set to consider patch-splitting, then, the large patch is split into two or more smaller patches along the boundaries separating the materials within the patch. It is not necessary to split the larger patch along all material boundaries (if there are more than one material boundaries). The patch 1105 is divided (cut) generally along the direction orthogonal to the direction in which the patch size exceeds.

In certain embodiments, once a decision is made to split a large patch, the patch splitting algorithm looks for a dominant material boundary in the patch that is further from one of the roughly parallel edges of the patch by at least the minimum value. A dominant material boundary is the longest material boundary within the pool of candidate boundaries and running along the direction of the cut (generally perpendicular to the direction in which the patch size exceeds). If the dominant material boundary runs completely across the patch (from one edge of the patch to the other), then the patch is divided into two along the dominant material boundary. Else, if the dominant material boundary doesn't completely run across the patch, then a set of patch boundaries are found that are connected to the dominant material boundary (and running generally along the same direction), and a dominant material boundary is found amongst those boundaries. This boundary is then connected to the previously found dominant boundary forming a longer dominant boundary. This process of searching and connecting to the dominant material boundary is repeated till a cut-line (doesn't need to be straight) is found that runs across the large patch. Then the patch is split along the dominant material boundary. In one exemplary embodiment, the "minimum value" described above could be the threshold value in pixels. In another exemplary embodiment, the "minimum value" could be the difference between the patch size and the video frame dimension along the direction in which the patch size exceeds.

Figure 12A:
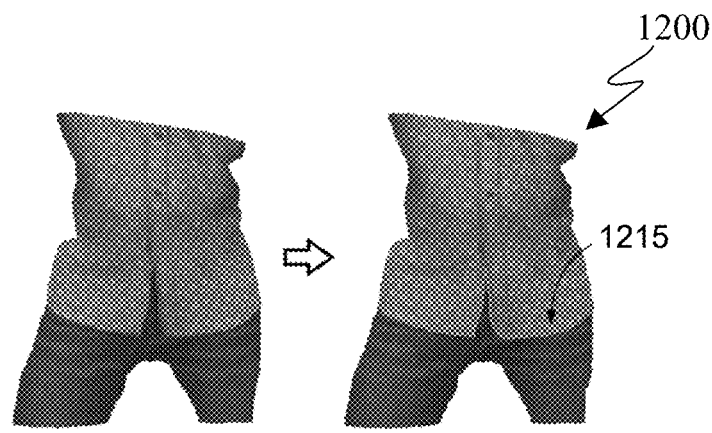
FIGS. 12A, 12B, and 12C illustrate example dominant feature boundaries in accordance with embodiments of this disclosure.
Figure 12B:
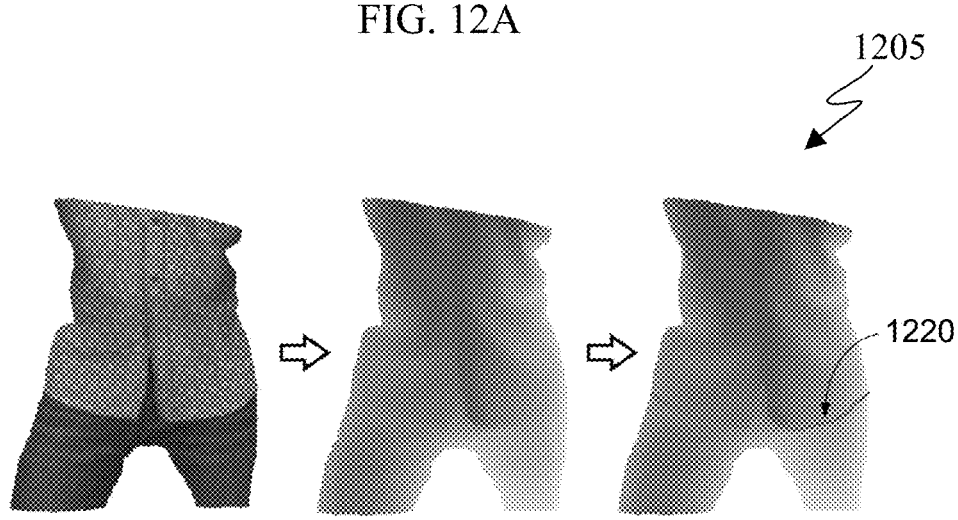
Figure 12C:
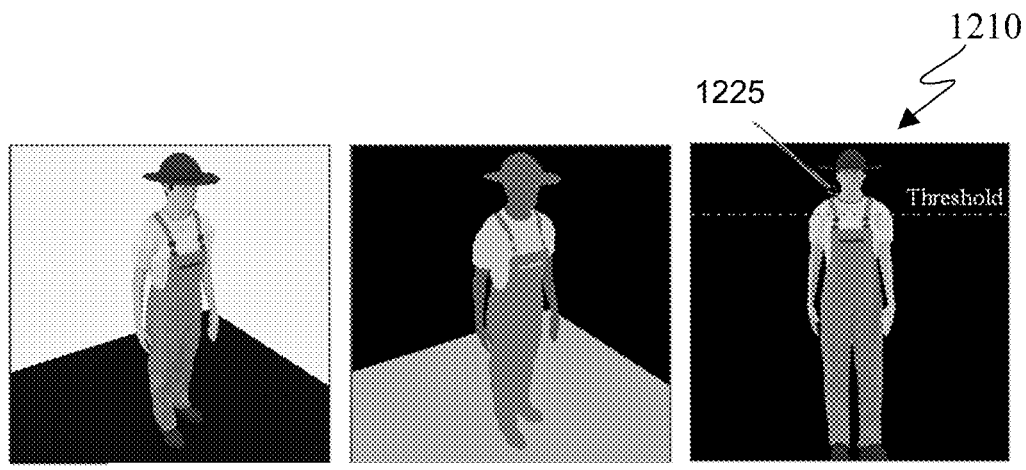

Besides point clouds, polygonal meshes are a popular format for representing 3D objects. Meshes typically consist of a set of interconnected triangles covering the surface of the object. In general, meshes can be represented by a set of vertices (and associated attributes such as color, texture coordinates, normal, material properties, etc.) and the set of interconnections between those the vertices. A mesh compression algorithm compresses the connectivity information as well as geometry and other attributes. The connectivity compression algorithm may decompose the connectivity into a sequence of adjacent triangles such as triangle strips or triangle fans. A V-PCC codec may be used to compress polygonal meshes by either storing the transformed connectivity as metadata or packing it into video frames. The V-PCC codec may encode the connectivity of each patch separately along with other patch information. In one embodiment, the decision of whether and/or how to split a patch is made based on the connectivity condition between the points in the patch to improve the connectivity compression performance. Connectivity compression methods may be limited to some special topologies, e.g. manifold, non-oriented, etc. In one embodiment, the decision to split a patch is made based on making a special topology, for example changing a non-manifold mesh to a manifold one FIGS. 12A, 12B, and 12C illustrate example dominant feature boundaries in accordance with embodiments of this disclosure. The embodiment of FIGS. 12A, 12B, and 11C are for illustration only and other embodiments could be used without departing from the scope of this disclosure.

As an example, FIG. 12A shows a large texture patch 1200 corresponding to the large geometry patch to be split and shows the dominant texture boundary 1215 along which the patch is to be split. The large texture patch 1200 can be split using texture information along split line along the texture discontinuity and the dominant texture boundary 1215. The dominant texture boundary 1215 can be determined based on an analysis of adjacent points having different texture information. When the adjacent texture information is determined to be different, the points can be considered transition points that make up a texture boundary.

As an example, FIG. 12B shows a large depth patch 1205 corresponding to the large geometry patch to be split and shows the 2D depth map or height map of the patch and shows the split line along the dominant depth boundary 1220 in the depth-map. The general procedure for segmenting the large patch into two or more regions (clusters) and finding the dominant boundary to split the patch remains the same as shown in the flowchart in FIG. 10. The dominant depth boundary 1220 can be determined based on an analysis of adjacent points having different depth information that exceeds a depth threshold. When the adjacent depth information is determined to be varied enough, the points can be considered transition points that make up a depth boundary.

As an example, FIG. 12C shows splitting patches along dominant material boundaries 1225. The point cloud (equally applicable to polygonal mesh) representation of a person can have a material of each point determined. The representation of the surface regions on the point cloud identified by associated material ID using pseudo color to show the different regions. A large patch from the point cloud can be split along the dominant material boundary 1225. The dominant material boundary 1225 can be determined based on an analysis of adjacent points having different material information. When the adjacent material information is determined to be different, the points can be considered transition points that make up a material boundary.

In certain embodiments, the larger patch is segmented not exclusively based on either texture or depth information, but rather using both the texture and the depth information present in the patch. Furthermore, any point cloud attribute can be used to cluster and segment the patch.

Figure 13:
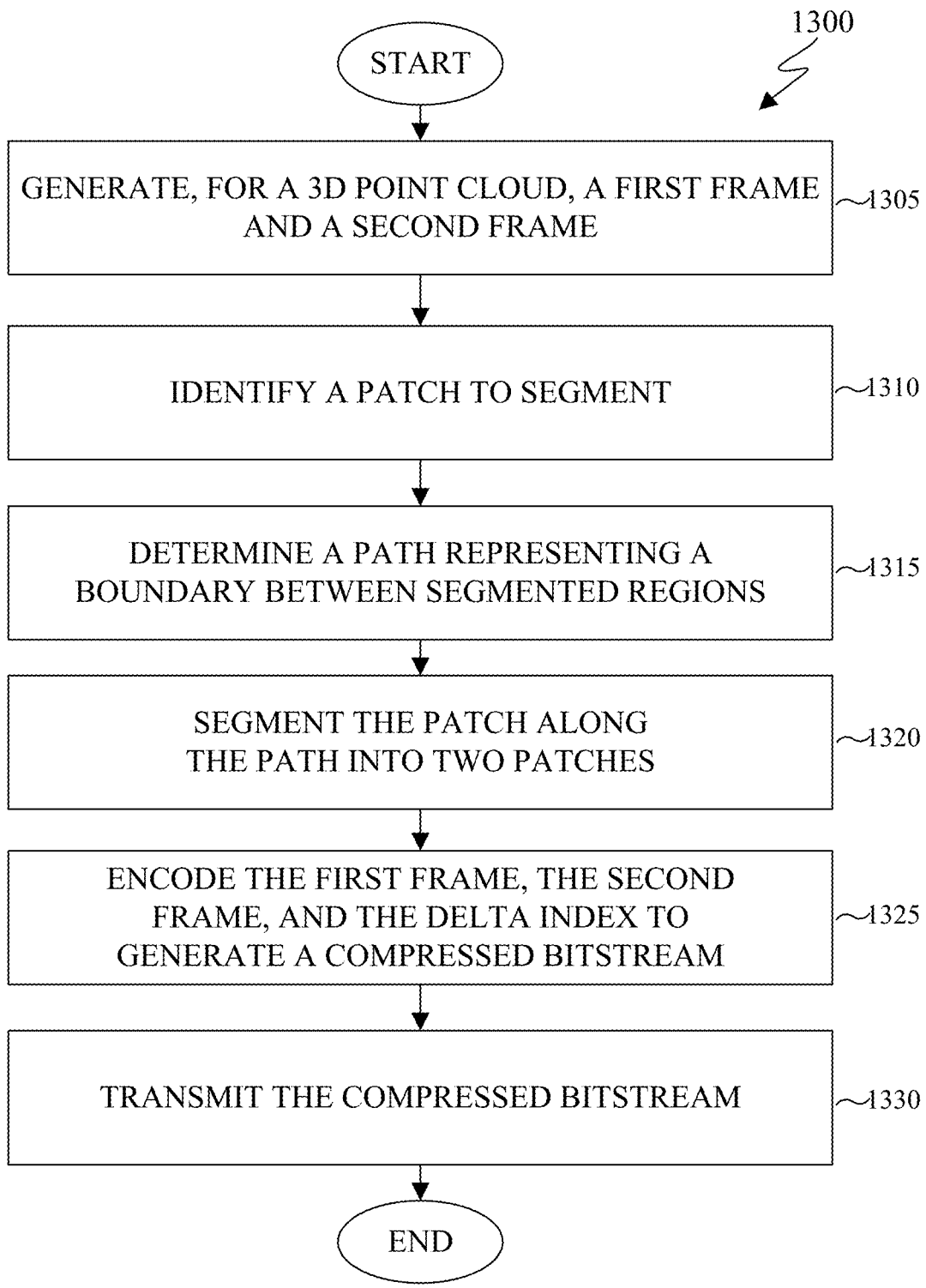
FIG. 13 illustrates example method for encoding a point cloud in accordance with an embodiment of this disclosure.

FIG. 13 illustrate example method 1300 for decoding a point cloud in accordance with an embodiment of this disclosure The method 1300 can be performed by the server 104 or any of the client devices 106-116 of FIG. 1, the server 200 of FIG. 2, the electronic device 300 of FIG. 3, the encoder 510 of FIGS. 5A and 5B, or any other suitable device or system. For ease of explanation, the method 1300 is described as being performed by the encoder 510 of FIGS. 5A and 5B.

In step 1305, the encoder 510 generates for a 3D point cloud a first frame and a second frame. The first frame and the second frame include patches that represent clusters of points in the 3D point cloud. The first frame can be referred to as a geometry frame while the second frame can be the texture frame.

In step 1310, the encoder 510 can identify a patch to segment in the patches of the first frame and the second frame. The patch can be identified based on a dimension of the patch exceeding a dimension threshold. The dimension threshold can be based on an encoder parameter, such as a maximum patch size. The maximum patch size is a specific instance of the dimension threshold and the description is not limited to this specific instance.

In step 1315, the encoder 510 can determine a path representing a boundary between segmented regions within the patch. The path can be determined is response to the identification of a dimension exceeding a dimension threshold. For example, when the major dimension of a patch exceeds a maximum dimension threshold, the patch is determined to require splitting. The determination of the path includes determining that at least one of the two patches does not exceed the dimension threshold. In other words, the path is within the dimension threshold. The path continuously extends from one side of the patch to an opposite side of the patch.

In embodiments where the path is a dominant texture boundary, the encoder 510 can identify a texture for each of the points in the patch. The texture information can be received or identified from the original point cloud. The encoder 510 can determine transition points in the patch based on the texture changing between adjacent points. The encoder can identify the dominant texture boundary based on a string of the transition points extending across the patch.

In embodiments where the path is a dominant depth boundary, the encoder 510 can identify a depth for each of the points in the patch. The depth information can be received or identified from the original point cloud. The encoder 510 can determine transition points in the patch based on the depth changing between adjacent points. The encoder can identify the dominant depth boundary based on a string of the transition points extending across the patch.

In embodiments where the path is a dominant material boundary, the encoder 510 can identify a material for each of the points in the patch. The material information can be received or identified from the original point cloud. The encoder 510 can determine transition points in the patch based on the material changing between adjacent points. The encoder can identify the dominant material boundary based on a string of the transition points extending across the patch.

In step 1320, the encoder 510 can segment the patch along the path into two patches. The patches can be individually packed within the first frame and the second frame. The path can separate the patch into more than two patches when the path extends across an empty region on the first frame and the second frame.

In step 1325, the encoder 510 encodes the two patches in the first frame, the second frame. The encoder 510 can multiplex the frames into a bitstream. In step 1330, the encoder 510 transmits the compressed bitstream. The compressed bitstream can be ultimately transmitted to a decoder, such as the decoder 550.

Although FIG. 13 illustrates one example of a method 1300 for point cloud encoding, various changes may be made to FIG. 13. For example, while shown as a series of steps, various steps in FIG. 13 could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An encoding device for point cloud encoding, the encoding device comprising:
a processor configured to:
generate, for a three-dimensional (3D) point cloud, a first frame and a second frame that include patches representing a cluster of points of the 3D point cloud;
identify a first patch to segment in the patches of the first frame and the second frame;
identify an attribute for points in the first patch;
determine, in response to identifying the first patch, transition points in the first patch based on the attribute changing between adjacent points;
identify an attribute boundary based on a string of the transition points extending entirely across the first patch;
determine a path representing the attribute boundary between segmented regions within the patch;
segment the first patch along the path into a second patch and a third patch for the first frame and the second frame; and
encode the second patch and the third patch in the first frame and the second frame to generate a compressed bitstream; and
a communication interface operably coupled to the processor, the communication interface configured to transmit the compressed bitstream.

2. The encoding device of claim 1, wherein:
the processor is further configured to identify the first patch to segment based on a dimension of the first patch exceeding a dimension threshold, and
the determination of the path is in response to the identification that the dimension of the first patch exceeds the dimension threshold.

3. The encoding device of claim 2, wherein:
more than one attribute boundary is identified based on the transition points,
to determine the path, the processor is further configured to determine the path based on an attribute boundary with a longest boundary in a direction that the first patch exceeded the dimension threshold.

4. The encoding device of claim 2, wherein the dimension threshold is a max patch size.

5. The encoding device of claim 2, wherein the dimension threshold is a function of a point cloud bit-depth.

6. The encoding device of claim 2, wherein, to determine the path, the processor is further configured to determine that at least one of the second patch and the third patch does not exceed the dimension threshold, which was exceeded by the first patch.

7. The encoding device of claim 2, wherein:
the attribute is a texture; and
the attribute boundary is a texture boundary.

8. The encoding device of claim 2, wherein:
the attribute is a depth, and
the attribute boundary is a depth boundary.

9. The encoding device of claim 2, wherein:
the attribute is a material identifier (ID); and
the attribute boundary is a material boundary.

10. The encoding device of claim 1, wherein the path continuously extends from one side of the first patch to an opposite side of the first patch in a direction in which the first patch exceeded a dimension threshold.

11. A method for point cloud encoding, the method comprising:
generating, using a processor of an encoder, a first frame and a second frame that include patches representing a cluster of points of three-dimensional (3D) point cloud;
identifying a first patch to segment in the patches of the first frame and the second frame;
identifying an attribute for points in the first patch;
determining, in response to identifying the first patch, transition points in the first patch based on the attribute changing between adjacent points;
identifying an attribute boundary based on a string of the transition points extending entirely across the first patch;
determining a path representing the attribute boundary between segmented regions within the patch;
segmenting the first patch along the path into a second patch and a third patch for the first frame and the second frame;
encoding the second patch and the third patch in the first frame and the second frame to generate a compressed bitstream; and
transmitting, using a communication interface operably coupled to the processor, the compressed bitstream.

12. The method of claim 11, further comprising identifying the first patch to segment based on a dimension of the first patch exceeding a dimension threshold,
wherein the determination of the path is in response to the identification that the dimension of the first patch exceeds the dimension threshold.

13. The method of claim 12, wherein:
more than one attribute boundary is identified based on the transition points,
to determine the path, the method further comprises determining the path based on an attribute boundary with a longest boundary in a direction that the first patch exceeded the dimension threshold.

14. The method of claim 12, wherein the dimension threshold is a max patch size.

15. The method of claim 12, wherein the dimension threshold is a function of a point cloud bit-depth.

16. The method of claim 12, wherein determining the path includes determining that at least one of the second patch and the third patch does not exceed the dimension threshold, which was exceeded by the first patch.

17. The method of claim 12, wherein:
the attribute is a texture; and
the attribute boundary is a texture boundary.

18. The method of claim 12, wherein:
the attribute is a depth, and
the attribute boundary is a depth boundary.

19. The method of claim 12, wherein:
the attribute is a material identifier (ID); and
the attribute boundary is a material boundary.

20. The method of claim 11, wherein the path continuously extends from one side of the first patch to an opposite side of the first patch in a direction in which the first patch exceeded a dimension threshold.

* * * * *